(12) United States Patent
Furukawa

(10) Patent No.: US 10,652,442 B2
(45) Date of Patent: May 12, 2020

(54) IMAGE CAPTURING APPARATUS WITH OPERATION MEMBERS PROVIDED ON DIFFERENT SIDES, CONTROL METHOD OF THE SAME, AND STORAGE MEDIUM

(71) Applicant: CANON KABUSHIKI KAISHA, Tokyo (JP)

(72) Inventor: Nobuyuki Furukawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 35 days.

(21) Appl. No.: 16/028,963

(22) Filed: Jul. 6, 2018

(65) Prior Publication Data
US 2019/0014246 A1      Jan. 10, 2019

(30) Foreign Application Priority Data

Jul. 10, 2017   (JP) .................................. 2017-134952

(51) Int. Cl.
*H04N 5/232*      (2006.01)
*H04N 5/225*      (2006.01)
(Continued)

(52) U.S. Cl.
CPC ......... *H04N 5/22525* (2018.08); *G06F 1/169* (2013.01); *G06F 3/03547* (2013.01); *G06F 3/0416* (2013.01); *G06F 3/0484* (2013.01); *G06F 3/0488* (2013.01); *H04N 5/2252* (2013.01); *H04N 5/2254* (2013.01); *H04N 5/23216* (2013.01); *H04N 5/23229* (2013.01);
(Continued)

(58) Field of Classification Search
CPC ....................... H04N 5/22525; H04N 5/23293
USPC ............ 348/333.01, 333.03, 333.08, 333.09; 396/373, 374
See application file for complete search history.

(56) References Cited

U.S. PATENT DOCUMENTS

2008/0145043 A1 * 6/2008 Katayama ............... G03B 13/36
396/125
2008/0170150 A1 * 7/2008 Kojima ................. H04N 5/2251
348/333.01
(Continued)

FOREIGN PATENT DOCUMENTS

JP        2001059984 A  *  3/2001  .............. G03B 7/00
JP        2013-238783 A     11/2013
(Continued)

*Primary Examiner* — Anthony J Daniels
(74) *Attorney, Agent, or Firm* — Cowan, Liebowitz & Latman, P.C.

(57) ABSTRACT

An image capturing apparatus comprises: a display unit visible via an eyepiece viewfinder; a proximity detection unit configured to detect proximity of an object to the eyepiece viewfinder; a specific operation unit arranged on a main body of the image capturing apparatus on a subject side with respect to an eyepiece unit, or arranged on a circumference of a barrel of an imaging lens; a memory; and at least one processor which functions as a control unit configured to perform control such that in a case where proximity of an object is detected, specific processing is performed in response to an operation made on the specific operation unit, and in a case where proximity of an object is not detected, the specific processing is not performed even when an operation is made on the specific operation unit.

9 Claims, 13 Drawing Sheets

(51) Int. Cl.
  *G06F 3/0488* (2013.01)
  *G06F 3/0484* (2013.01)
  *G06F 3/041* (2006.01)
  *G06F 1/16* (2006.01)
  *G06F 3/0354* (2013.01)

(52) U.S. Cl.
  CPC ... *H04N 5/23293* (2013.01); *H04N 5/232411* (2018.08); *G06F 2203/0339* (2013.01); *H04N 5/23245* (2013.01)

(56) References Cited

U.S. PATENT DOCUMENTS

| | | | |
|---|---|---|---|
| 2011/0267526 A1* | 11/2011 | Ishihara | G03B 3/10 348/333.01 |
| 2013/0083228 A1* | 4/2013 | Iwatani | H04N 5/23216 348/333.01 |

FOREIGN PATENT DOCUMENTS

| | | | |
|---|---|---|---|
| JP | 2015-188137 A | 10/2015 | |
| WO | WO-2017085982 A1 * | 5/2017 | ............... G03B 7/26 |

* cited by examiner (Prior Art)

(Prior Art)

IMAGE CAPTURING APPARATUS WITH OPERATION MEMBERS PROVIDED ON DIFFERENT SIDES, CONTROL METHOD OF THE SAME, AND STORAGE MEDIUM

BACKGROUND OF THE INVENTION

Field of the Invention

The present invention relates to an image capturing apparatus with operation members provided on different sides, a control method of the same, and a storage medium.

Description of the Related Art

Conventionally, cameras are known in which a high-definition shot image is displayed on a large display member provided on the back side thereof, so that a user can view the details of the shot image. Also, some of these cameras have a function of a touch panel or the like that is superimposed on the backside display member of the camera, providing an easily-handled user interface (UI).

The display member provided on the back side of the camera has the problem that displayed images are dark and are difficult to view under sunlight in fine weather, and there are also many users who desire to perform shooting using a conventional viewfinder. In view of such demand and an increase in definition of small display members, cameras provided with a viewfinder in which a small display member is incorporated are becoming widespread. Such a camera is provided with a large display on the back side of the camera and an in-finder display, and a user uses these display members depending on the usage.

When the user is to operate the camera while viewing the in-finder display, the user brings his or her face into proximity to the device, and thus it is difficult for the user to operate a touch panel provided on the backside display member with his or her finger. Also, when the face is in proximity of the device, there are cases where the face or nose in proximity of the device may get into contact with the touch panel, causing an erroneous operation.

To address such an operation problem that may be caused when the face is in proximity of a device, Japanese Patent Laid-Open No. 2015-188137 discloses a technology of a mobile phone that is provided with operation units arranged on the front and back sides of the mobile phone, and a member configured to detect a finger being in contact with the left or right side of the mobile phone, wherein if fingers are detected that are in contact with the respective sides, then a touch operation on the front-side operation unit will be enabled. Furthermore, Japanese Patent Laid-Open No. 2013-238783 discloses a technology of a camera provided with operation units on the front and back sides, wherein a warning is displayed against an erroneous operation that may be caused when an operation position on the front-side operation unit is invisible.

The technique described in the above-described Japanese Patent Laid-Open No. 2015-188137 is advantageous for a device like a mobile phone in which a position at which a user holds it and a position at which the user operates it are clearly distinguishable. However, in a device like a camera that is provided with a grip unit, and touch-operable operation members arranged on different sides of the device, there may be cases where a holding position and an operating position are unlikely to be distinguished, and thus a touch operation cannot be controlled appropriately.

Specifically, a conventional example of a camera provided with a grip unit, and operation units arranged on the front and back sides will be described with reference to FIGS. 10A and 10B. The reference numeral 1000 denotes a camera main body, and the camera includes an imaging lens 1002, and a viewfinder 1003 into which a user looks when performing shooting. The reference numeral 1004 denotes a backside display member, which is provided with a touch panel 1005 for accepting instructions from the user through touch operations. For example, in live view shooting where shooting content is displayed on the backside display member 1004, the user performs shooting while viewing an image displayed on the backside display member 1004.

The user holds a right-hand grip 1006 with his or her right middle, third, and little fingers, and presses a release button 1007 to start shooting operation at a desired timing. At this time, a holding member 1008 facilitates the hold at the root of the thumb. When adjusting an aperture during shooting, the user operates a narrow-down button 1009 arranged on the imaging lens 1002. A left-hand touch panel 1013 and a right-hand touch panel 1014 are arranged on, for example, the front side of the camera, so that the user performs touch operation using his or her index or middle fingers while holding the camera.

FIG. 11AA shows the state in which shooting (that is, live view shooting) is performed while a captured image is displayed on the display member 1004. When performing live view shooting, the user holds the camera by holding the grip 1006 using the camera front side and placing the root of his or her thumb in contact with the holding member 1008. At this time, the user can use the thumb to perform touch operation (to give an instruction regarding a shooting position, or configure menu settings, for example) on the touch panel 1005. On the other hand, when performing shooting while looking through the viewfinder 1003, the user holds the camera with his or her two thumbs, and thus perform operation using a finger, such as an index finger, other than the thumbs, as shown in FIG. 11AB. This state when viewed from another angle is shown in FIGS. 11BA and BB. When performing shooting while looking through the viewfinder 1003, the user operates, with his or her right index finger, the release button 1007 (FIG. 11BA) or the narrow-down button 1009 (FIG. 11BB). Furthermore, when performing the operation as shown in FIG. 11BA or FIG. 11BB, the user may support the lens 1002 with his or her left hand to prevent the camera held by his or her right hand from rotating, supplementarily holding the camera (FIG. 11CA). In addition, while contacting and holding the camera in the same manner as the above-described case, the user may operate a member for changing the focus state or a member for changing the zoom state that is provided on the lens 1002.

In the above-described example, thus, the operation member to be operated changes depending on the shooting state, and a holding position and an operating position are unlikely to be distinguishable. That is, during shooting shown in FIG. 11AA, an operation member provided on the display member 1004 side is mainly used, but if, at this time, the touch panels provided on the subject side can accept an operation, a holding finger may unintentionally cause an erroneous operation. Also, if a main holding member such as the grip 1006 is provided on one hand side, the other hand will perform supplementary holding operation, and thus the holding position or the operating position of the left hand may change depending on the shooting state, as shown in FIG. 11CA. Accordingly, there are variety of holding or operating modes that depend on the shooting state, and it is difficult to distinguish them.

The technique of Japanese Patent Laid-Open No. 2013-238783 enables a user to view a warning indication when he or she performs operation while looking the display unit provided on the back side of the camera. However, if the user is not looking the screen while, for example, carrying the camera and walking, the warning indication does not work. If an operation on the touch panel on the front side of the camera is enabled, an erroneous operation may be caused on the touch panel on the front side of the camera when, for example, the user puts down the camera between events of shooting and holds the grip with his or her right fingers other than the thumb as shown in FIG. 11CB.

SUMMARY OF THE INVENTION

The present invention has been made in consideration of the aforementioned problems, and realizes a technique for suppressing erroneous operations that may be caused on a touch operation member arranged on a side different from a display surface of a display member.

In order to solve the aforementioned problems, one aspect of the present invention provides an image capturing apparatus comprising: an image capturing unit; a display unit visible via an eyepiece viewfinder; a proximity detection unit configured to detect proximity of an object to the eyepiece viewfinder so as to detect viewing of the eyepiece viewfinder; a specific operation unit arranged on a main body of the image capturing apparatus on a subject side with respect to an eyepiece unit of the eyepiece viewfinder, or arranged on a circumference of a barrel of an imaging lens; a memory; and at least one processor which functions as a control unit configured to perform control such that in a case where proximity of an object that satisfies a predetermined condition is detected by the proximity detection unit, specific processing is performed in response to an operation made on the specific operation unit, and in a case where proximity of an object that satisfies the predetermined condition is not detected by the proximity detection unit, the specific processing is not performed even when an operation is made on the specific operation unit.

Another aspect of the present invention provides, an image capturing apparatus comprising: an image capturing unit; a display unit visible via an eyepiece viewfinder; a specific operation unit arranged on a main body of the image capturing apparatus on a subject side with respect to an eyepiece unit of the eyepiece viewfinder, or arranged on a circumference of a barrel of an imaging lens; a memory; and at least one processor which functions as a control unit configured to perform control such that in a case where the image capturing apparatus takes a driven state, in which the image capturing apparatus is on, and in a case where the display unit is in a display state, specific processing is performed in response to an operation made on the specific operation unit, and in a case where the image capturing apparatus takes the driven state, in which the image capturing apparatus is on, and in a case where the display unit is in a non-display state, the specific processing is not performed even when an operation is made on the specific operation unit.

Still another aspect of the present invention provides, a control method of an image capturing apparatus that comprises an image capturing unit, a display unit visible via an eyepiece viewfinder, a proximity detection unit configured to detect proximity of an object to the eyepiece viewfinder so as to detect viewing of the eyepiece viewfinder, and a specific operation unit arranged on a main body of the image capturing apparatus on a subject side with respect to an eyepiece unit of the eyepiece viewfinder, or arranged on a circumference of a barrel of an imaging lens, the method comprising: performing control such that in a case where proximity of an object that satisfies a predetermined condition is detected by the proximity detection unit, specific processing is performed in response to an operation made on the specific operation unit, and in a case where proximity of an object that satisfies the predetermined condition is not detected by the proximity detection unit, the specific processing is not performed even when an operation is made on the specific operation unit.

Yet another aspect of the present invention provides, a control method of an image capturing apparatus that comprises an image capturing unit, a display unit visible via an eyepiece viewfinder, and a specific operation unit arranged on a main body of the image capturing apparatus on a subject side with respect to an eyepiece unit of the eyepiece viewfinder, or arranged on a circumference of a barrel of an imaging lens, the method comprising: performing control such that in a case where the image capturing apparatus takes a driven state, in which the image capturing apparatus is on, and in a case where the display unit is in a display state, specific processing is performed in response to an operation made on the specific operation unit, and in a case where the image capturing apparatus takes the driven state, in which the image capturing apparatus is on, and in a case where the display unit is in a non-display state, the specific processing is not performed even when an operation is made on the specific operation unit.

Still yet another aspect of the present invention provides, a non-transitory computer-readable storage medium storing a program for causing a computer to execute a control method of an image capturing apparatus that comprises an image capturing unit, a display unit visible via an eyepiece viewfinder, and a specific operation unit arranged on a main body of the image capturing apparatus on a subject side with respect to an eyepiece unit of the eyepiece viewfinder, or arranged on a circumference of a barrel of an imaging lens, the method comprising: performing control such that in a case where the image capturing apparatus takes a driven state, in which the image capturing apparatus is on, and in a case where the display unit is in a display state, specific processing is performed in response to an operation made on the specific operation unit, and in a case where the image capturing apparatus takes the driven state, in which the image capturing apparatus is on, and in a case where the display unit is in a non-display state, the specific processing is not performed even when an operation is made on the specific operation unit.

According to the present invention, it is possible to suppress erroneous operations that may be caused on a touch operation member arranged on a side different from a display surface of a display member.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

First Embodiment

Hereinafter, exemplary embodiments of the present invention will be described in detail with reference to the drawings.

External Configuration of Digital Camera 100

Figure 1A:
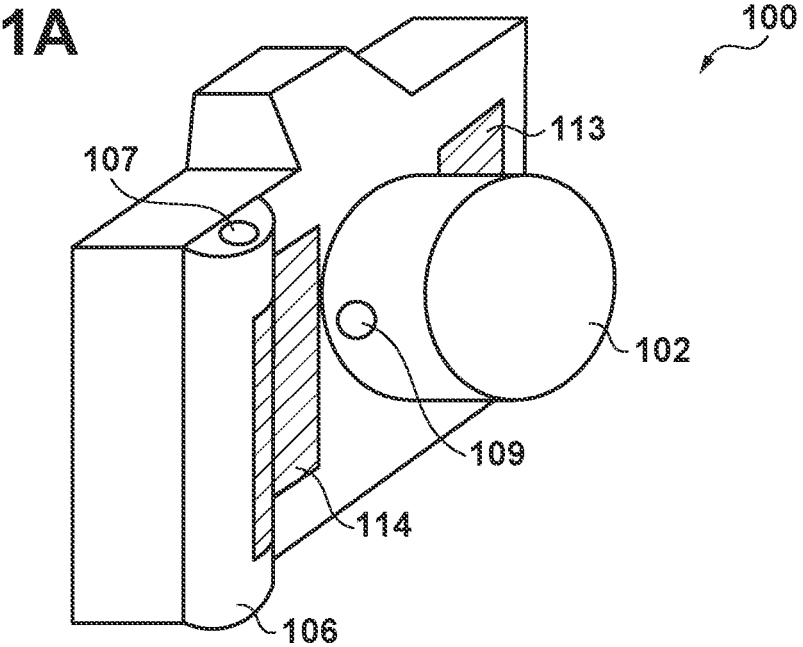
FIGS. 1A to 1C illustrate an example of an external configuration of a digital camera serving as an example of an electronic device according to a first embodiment.
Figure 1B:
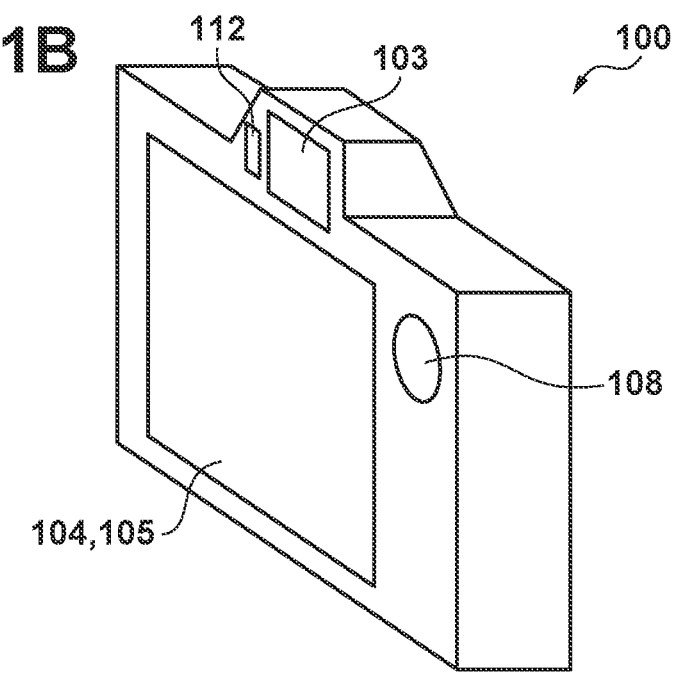
Figure 1C:
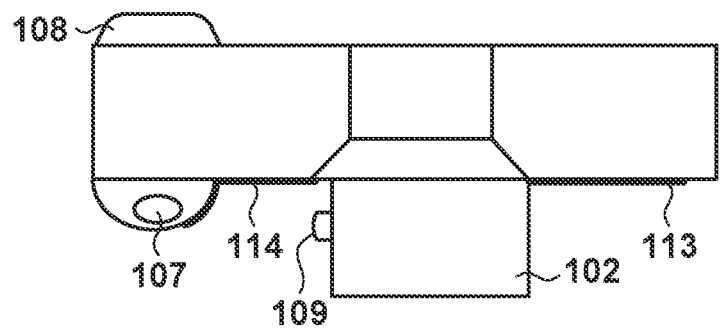

An example of an external configuration of a digital camera 100, which serves as an example of an electronic device of the present embodiment, will be described with reference to FIGS. 1A to 1C. FIGS. 1A to 1C respectively show the outer appearances of the front side of the camera, the back side of the camera, and the upper side of the camera. Note that in the present embodiment, "front side" refers to the side on which an imaging lens 102 of the digital camera 100 is arranged, that is, the subject side, or the side opposite to the user who is performing shooting. Also, "back side" refers to the side on which the user who is operating the digital camera 100 is located, that is, the side on which a viewfinder 103 of the digital camera 100 and the display surface of a backside monitor 104 thereof are arranged.

The imaging lens 102 is an imaging optical system, includes a group of lenses such as a zoom lens and a focus lens, and is configured to guide a subject optical image from a subject to an imaging element included in an image capturing unit 204, which will be described later. Furthermore, the imaging lens 102 includes an operation member for changing the zoom position or the focus position.

The viewfinder 103 is an eyepiece viewfinder, and is configured to display, on a display device provided within the viewfinder 103, image data that is generated as digital signals and based on which an image is formed on the imaging element of the image capturing unit 204 via the imaging optical system of the imaging lens 102, for example. For example, an electronic viewfinder capable of displaying a live view image, which is captured image data, or a menu screen for operating the digital camera 100 is configured, and the user views live view display or information display by looking through the viewfinder 103. The viewfinder 103 may also be an optical viewfinder that enables a subject optical image to be viewed via a mirror optical system or a pentaprism optical system, and includes, inside thereof, the above-described display device for information display.

The backside monitor 104 is a display unit that is configured to display images and various types of information, and is provided on the back side of the camera. The backside monitor 104 is provided with a touch panel 105 over the entire surface of the display unit (that is, the upper surface of substantially the same area as that of the backside monitor 104), and is able to accept touch operations from the user on the menu screen displayed on the display unit. When performing shooting such as live view shooting while shooting content is displayed on the backside monitor 104, the user can perform shooting while viewing an image displayed on the backside monitor 104.

The touch panel 105 includes a touch sensor, and the user can contact the touch panel to give an instruct regarding a position at which focus is automatically achieved on the image displayed on the backside monitor 104, or an instruction regarding a certain operation on the displayed menu. Note that the certain operations include, for example, an operation for setting or changing any of shooting conditions such as an aperture value, a shutter speed, an ISO sensitivity, and an exposure compensation. The touch panel will be described in detail later.

A right-hand grip 106 is a holding member that is so bulgy that a user can easily hold the camera, and is held by the right middle, third, and little fingers of the user. The reference numeral 107 denotes a release button, which is an operation member for the user to instruct the camera to start imaging operation. The reference numeral 108 denotes a holding member, which has a catching shape that makes better hold at the root of the thumb possible. The reference numeral 109 denotes a narrow-down button, which is used, for example, to adjust an aperture 203. A left-hand touch panel 113 and a right-hand touch panel 114 are both arranged on a side (for example, the front side of the camera) different from the display surface of the backside monitor 104. These operation members are arranged on the assumption that the user operates the operation members with his or her index or middle fingers while holding the camera. The left-hand touch panel 113 and the right-hand touch panel 114 can sense the same touch operation as that on the touch panel 105. The touch panels will be described in detail later. The right-hand touch panel 114 shown in FIGS. 1A and 1C has a configuration in which part thereof is curved to reach the right-hand grip 106, but may also have a flat configuration so that it is arranged only within a plane portion or may be arranged so as to cover the right-hand grip 106.

Configuration of Digital Camera 100

Figure 2:
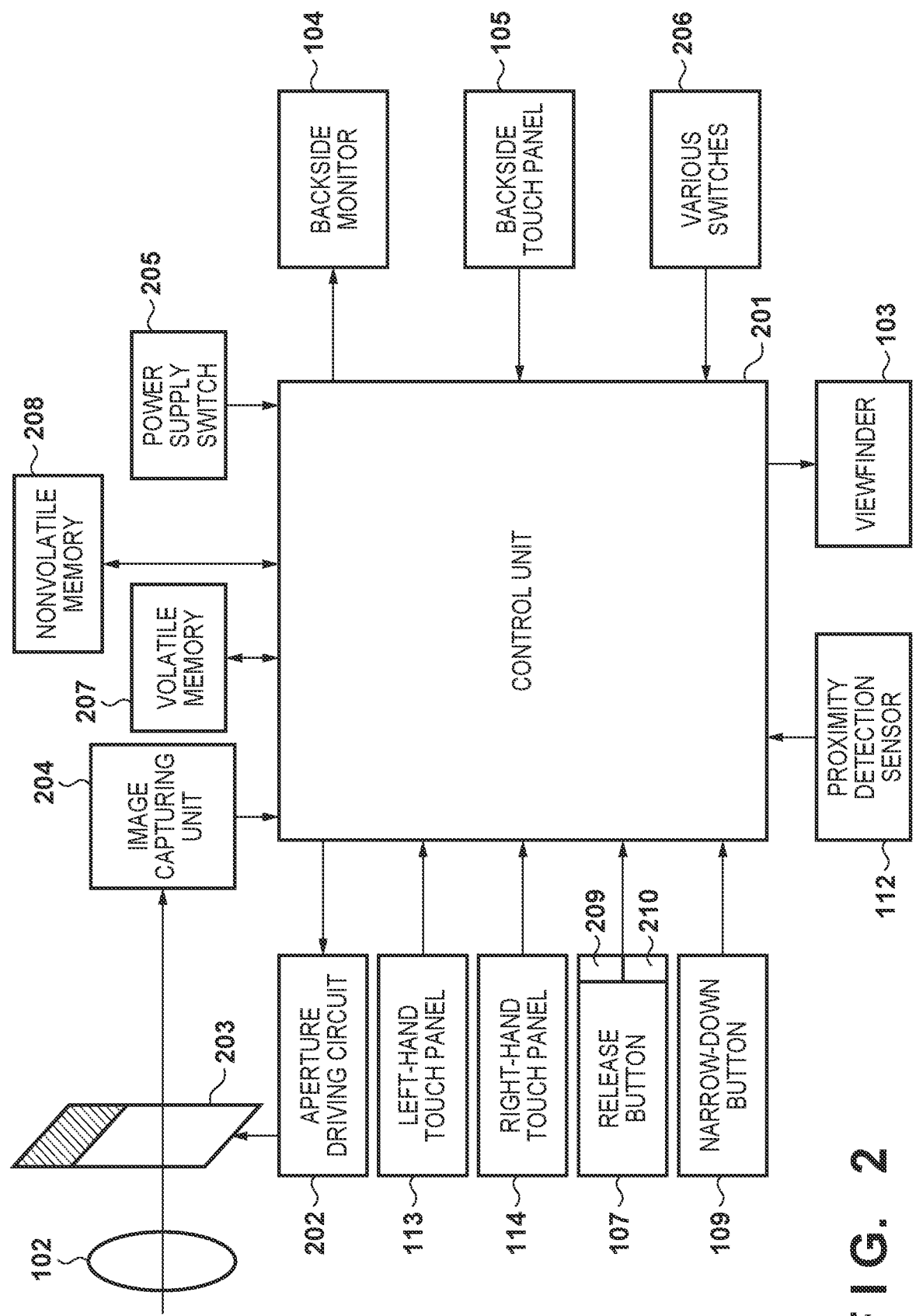
FIG. 2 is a block diagram illustrating an example of a functional configuration of the digital camera according to the first embodiment.

The following will describe a configuration of the digital camera 100 according to the present embodiment with reference to FIG. 2. The viewfinder 103 is provided with, inside thereof, a display device constituted by an organic EL display, a liquid crystal display or the like, for example. The backside monitor 104 is a display device provided on the back side of the camera, and is constituted by an organic EL display, a liquid crystal display or the like, for example. The viewfinder 103 and the backside monitor 104 displays a captured image, a menu screen for operating the digital camera 100, or the like in accordance with an instruction of a control unit 201. The backside touch panel 105 is one of operation members capable of detecting contact of the backside monitor 104. The backside touch panel 105 and the backside monitor 104 can be formed as an integral. For example, the backside touch panel 105 is constructed in such a manner that the transmittance of light will not interfere with the display presented by the backside monitor 104, and it is attached to the uppermost layer of the display surface of the backside monitor 104. Also, input coordinates on the backside touch panel 105 and display coordinates on the backside monitor 104 are correlated. As a result, a GUI (graphical user interface) can be constructed that makes it possible for the user to directly manipulate the screen displayed on the backside monitor 104. The control unit 201 is capable of detecting the following operations and conditions on the backside touch panel 105:

Newly touching of the backside touch panel 105 by a finger or a pen which has not been in contact with the backside touch panel 105. That is, a start of the touch (referred to as "Touch-Down" below).

A state in which the backside touch panel 105 is in contact with a finger or a pen (referred to as "Touch-On" below).

Movement of a finger or pen while being in contact with the backside touch panel 105 (referred to as "Touch-Move" below).

Lifting of a finger or pen that has been in contact with the backside touch panel 105. That is, an end of the touch (referred to as "Touch-Up" below).

A state in which the backside touch panel 105 is not being touched at all (referred to as "Touch-Off" below).

When "Touch-Down" is detected, the "Touch-On" state is also detected at the same time. Unless "Touch-Up" is detected after "Touch-Down", "Touch-On" usually continues to be detected. "Touch-Move" is also detected in a state where "Touch-On" is being detected. Even if "Touch-On" is being detected, "Touch-Move" is not detected unless the touch position moves. After "Touch-Up" of all the fingers or a pen that have been in contact is detected, the "Touch-Off" state is entered.

These operations/conditions and positional coordinates at which the backside touch panel 105 is being touched by the finger or pen are communicated to the control unit 201 through a not-shown internal bus. The control unit 201 determines, based upon the information thus communicated, what kind of operation (touch operation) was performed on the backside touch panel 105. As for "Touch-Move", the determination can be made also for every vertical component and horizontal component with regard to the direction of movement of the finger or pen, which is moved on the backside touch panel 105, based upon a change in the coordinate position. It can be determined that a slide operation has been performed if it detects a "Touch-Move" over a predetermined distance. An operation in which a finger is touched against the touch panel, swiftly moved a certain distance, and then lifted away will be referred to as a "flick". In other words, a flick is an operation in which a finger is swiftly flicked across the backside touch panel 105. If a "Touch-Move" with a predetermined distance or longer and a predetermined speed or higher is detected, and then a "Touch-Up" is detected, it can be determined that a flick has been performed (it can be determined that a flick is performed in succession to a slide operation). Furthermore, a touch operation in which the touch panel is touched at multiple locations (for example, two points) at the same time, and then the touch positions are moved closer to each other will be referred to as a "pinch-in", and a touch operation in which the touch positions are moved away from each other will be referred to as a "pinch-out". Pinch-out and pinch-in operations will be collectively referred to as "pinch operations" (or simply "pinching"). The backside touch panel 105 may employ a touch panel method that relies upon any of the following: resistive film, electrostatic capacitance, surface acoustic waves, infrared radiation, electromagnetic induction, image recognition and optical sensing. There are methods in which a touch is detected based on contact with the touch panel, as well as methods in which a touch is detected based on approach of a finger or a pen to the touch panel, and any method may be employed.

The left-hand touch panel 113 and the right-hand touch panel 114 can detect the same operations and conditions as those on the above-described backside touch panel 105. Furthermore, the left-hand touch panel 113 and the right-hand touch panel 114 may employ a touch panel method that relies upon any of the following: resistive film, electrostatic capacitance, surface acoustic waves, infrared radiation, electromagnetic induction, image recognition and optical sensing. There are methods in which a touch is detected based on contact with the touch panel, as well as methods in which a touch is detected based on approach of a finger or a pen to the touch panel, and any method may be employed.

The release button 107 includes a first shutter switch 209 and a second shutter switch 210. While the release button 107 provided on the digital camera 100 is being operated, that is, pressed halfway down (shooting preparation instruction), the first shutter switch 209 is turned on and generates a first shutter switch signal SW1. With the first shutter switch signal SW1, operations such as AF (automatic focus) processing, AE (automatic exposure) processing, AWB (automatic white balance) processing, or EF (flash pre-emission) processing starts. When the operation of the release button 107 is complete, that is, the release button 107 is pressed all the way down (shooting instruction), the second shutter switch 210 is turned on and generates a second shutter switch signal SW2. Upon receiving the second shutter switch signal SW2, the control unit 201 starts a series of operations of shooting processing from reading out a signal from the image capturing unit 204 to writing image data to a nonvolatile memory 208.

A proximity detection unit 112 detects an eye (object) being in proximity (eye-on) to and being moved away (eye-off) from an eyepiece unit of the viewfinder 103 (proximity detection). The control unit 201 switches the backside monitor 104 and the display device inside the viewfinder 103 between ON (display state) and OFF (non-display state) depending on the state detected by the proximity detection unit 112. The proximity detection unit 112 can employ, for example, an infrared proximity sensor, and can detect proximity of an object that satisfies a predetermined condition to the eyepiece unit of the viewfinder 103. For example, if an object is brought into proximity, infrared light projected from a light projecting unit (not shown) of the proximity detection unit 112 is reflected and is received by a light receiving unit (not shown) of the infrared proximity sensor. The proximity detection unit 112 can determine, based on the amount of received infrared light for example, how close to the eyepiece unit the object is (eye-on distance). That is, the proximity detection unit 112 can detect that the object is in proximity thereto by less than a predetermined distance. Note that the proximity detection unit 112 of the present embodiment detects "eye-on" upon detecting, in a non-eye-on state (non-proximity state), an object approaching the eyepiece unit of the viewfinder 103 by less than a predetermined distance, for example. On the other hand, the proximity detection unit 112 detects "eye-off" upon detecting, in an eye-on state (proximity state), the object detected as being in proximity moving away by a predetermined distance or greater. A threshold for detection of "eye-on" and a threshold for detection of "eye-off" may be different from each other by providing a hysteresis, for example. After "eye-on" is detected, the eye-on state continues until "eye-off" is detected. After "eye-off" is detected, the non-eye-on state continues until "eye-on" is detected. Note that the infrared proximity sensor is an example, and the proximity detection unit 112 may employ another sensor as long as it can detect proximity of an eye or an object, which can be regarded as "eye-on". For example, a sensor for detecting a change in static electricity or a contact-type sensor for detecting pressure or a displacement of a component may also be used.

The control unit 201 includes one or more processors such as a CPU (or a GPU), and the later-described processing of the present embodiment is realized by a program stored in the nonvolatile memory 208 being expanded in a volatile memory 207 and the expanded program being executed. Furthermore, upon receiving a user operation from the operation member such as the release button 107, the control unit 201 controls the blocks of the digital camera 100 in accordance with the operation signal thereof.

The volatile memory 207 includes a memory such as a SDRAM for example, and temporarily stores constants and variables for use in operations of the control unit 201, the program read out from the nonvolatile memory 208, and the like. The nonvolatile memory 208 includes a recording medium such as a semiconductor memory or a magnetic disk for example, and records a program and constants to be executed by the control unit 201, and the like. Furthermore, image data read out from the image capturing unit 204 may also be recorded.

An aperture driving circuit 202 drives the aperture 203 in accordance with an instruction from the control unit 201. The aperture 203 is adjusted in its opening size to adjust the amount of light that enters the imaging element of the image capturing unit 204 through the aperture 203.

The image capturing unit 204 includes the imaging element, a driving circuit, a developing circuit, and the like. The imaging element has a configuration in which a plurality of pixels each having a photoelectric conversion element are two-dimensionally arrayed. The imaging element photoelectrically converts a subject optical image formed by the imaging lens 102 with respect to each pixel, performs analog-digital conversion using an A/D conversion circuit, and outputs resultant digital signals (image data) in units of pixel. The imaging element may be an imaging element such as a CCD (Charge-Coupled Device) image sensor or a CMOS (Complementary Metal Oxide Semiconductor) image sensor.

A power supply switch 205 is an operation member for the switching on/off of the power supply to the digital camera 100, and notifies the control unit 201 of detection of turning on or off by the user. Various switches 206 include operation members other than the above-described operation members, and examples thereof include a D-pad (four directional key) whose upper, lower, left, and right portions can be pressed into, and a SET button for use in deciding a selection item. The user operates these operation members using, for example, the menu displayed on the backside monitor 104. In place of operations on the backside touch panel 105, these operation members may be used to set or change shooting conditions, such as for example, an aperture value, a shutter speed, an ISO sensitivity, and an exposure compensation. The various switches 206 include a record button for use in giving an instruction to start or stop moving image shooting (recording) in a moving image shooting mode, and the like. Furthermore, an electronic dial for a rotating operation member capable of moving a selection frame or feeding an image.

Series of Operations of Input Operation Control Processing

Figure 3:
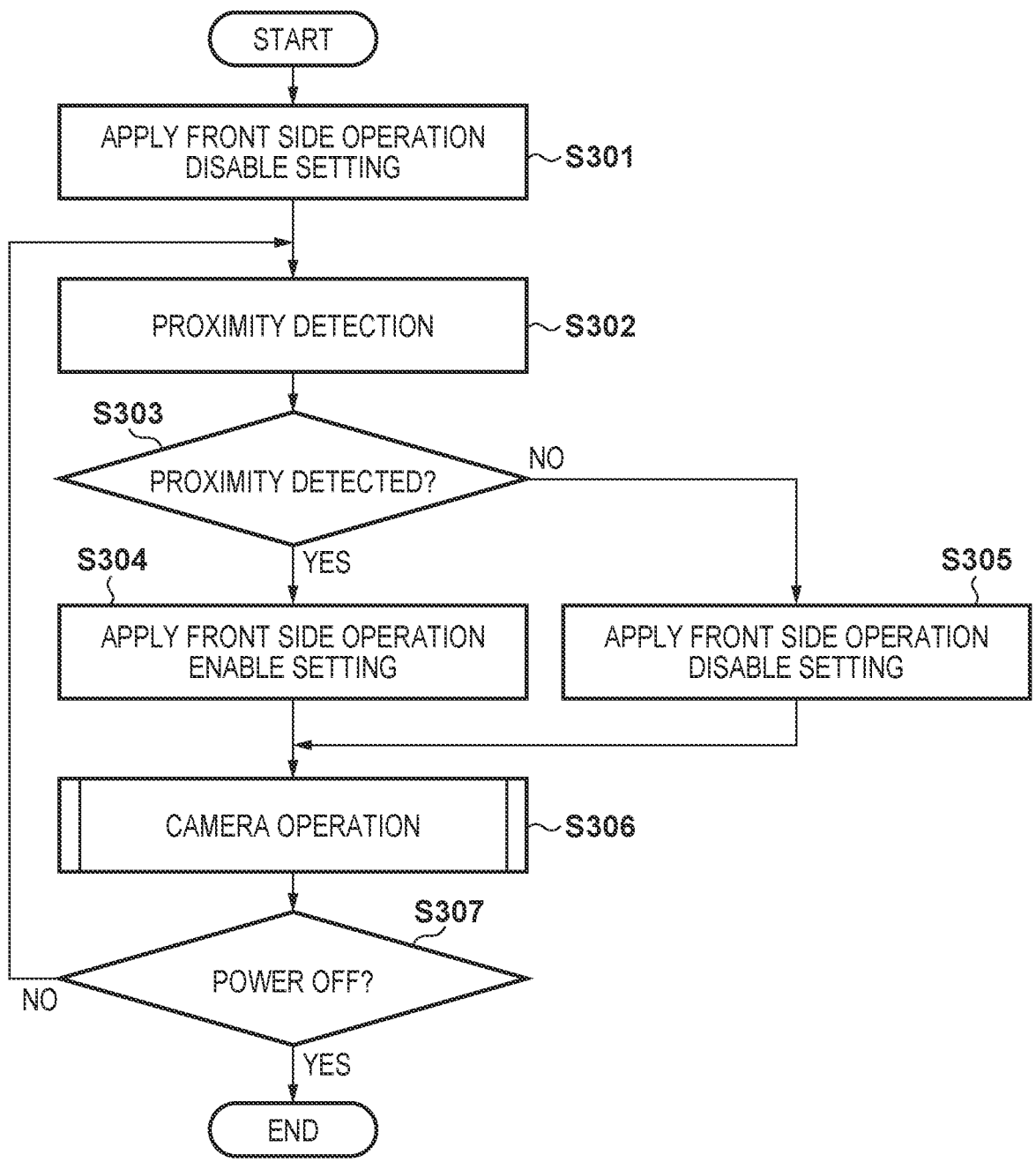
FIG. 3 is a flowchart illustrating a series of operations of input operation control processing according to the first embodiment.

The following will describe a series of operations of input operation control processing with reference to FIG. 3. Note that the input operation control processing of the present embodiment is to control whether input operations on the operation members (namely, the left-hand touch panel 113 and the right-hand touch panel 114) arranged on the front side of the digital camera 100 are enabled or disabled based on detection of proximity of an object. Furthermore, the present processing is realized by the control unit 201 expanding a program stored in the nonvolatile memory 208 in a work area of the volatile memory 207 and executing the expanded program, and controlling the components such as the backside touch panel 105.

The procedure shown in FIG. 3 starts when the power supply switch 205 is turned on. The following description will be given taking a case where, immediately after the turning-on, a setting to disable any operation on the left-hand touch panel 113 and the right-hand touch panel 114 (referred to also as "front side operation disable setting") is configured, as an example. However, another setting may be used as appropriate in place of this setting, such as a setting in which the characteristic of the digital camera or former usage state is reflected.

In step S301, the control unit 201 applies the front side operation disable setting. For example, the control unit 201 reads setting information stored in the nonvolatile memory 208 for example, and applies the front side operation disable setting. When the front side operation disable setting is applied, the control unit 201 prohibits (disables) operations on the left-hand touch panel 113 and the right-hand touch panel 114, and even when the user has performed a touch operation on them, the control unit 201 does not accept the operation. Note that in the following example, an operation on the operation member that is arranged on the front side of the digital camera 100, such as the narrow-down button 109, other than the left-hand touch panel 113 and the right-hand touch panel 114 is enabled. In contrast, it is also possible to select, using a separate setting menu, whether or not the front side operation disable setting is also applied to the member such as the button arranged on the front side. Furthermore, it is also possible for a user to change individual settings, such as the setting to enable only the narrow-down button 109, or the setting to enable only one of the left and right-hand touch panels. Of course, any of the settings may be set before shipment by manufacturers.

In step S302, the control unit 201 performs proximity detection with respect to the eyepiece unit of the viewfinder 103. The control unit 201 reads the state of proximity of an object to the eyepiece unit of the viewfinder 103 based on an output signal from the proximity detection unit 112 for example. In step S303, the control unit 201 determines whether or not an object is in proximity. If the output signal from the proximity detection unit 112 shows that proximity of an object has been detected, the control unit 201 determines that proximity has been detected, and proceeds to step S304. On the other hand, if the output signal from the proximity detection unit 112 shows that proximity of an object has not been detected, the control unit 201 determines that proximity has not been detected, and proceeds to step S305. In other words, if it is assumed that the user is looking through the viewfinder 103, the procedure proceeds to step S304, and if it is assumed that the user is not looking through the viewfinder 103 and the digital camera 100 is being used in a LV mode, the procedure proceeds to step S305.

In step S304, the control unit 201 applies a front side operation enable setting. In other words, the control unit 201 applies the setting (front side operation enable setting) to enable operations on the left-hand touch panel 113 and the right-hand touch panel 114.

In step S305, the control unit 201 applies the front side operation disable setting. In other words, the control unit 201 applies the setting to disable any operation on the left-hand touch panel 113 and the right-hand touch panel 114. If the front side operation disable setting has already been applied in step S301, the front side operation disable setting is maintained. Once the front side operation enable setting is applied in step S304, the front side operation disable setting is newly applied.

In step S306, the control unit 201 performs, based on the setting, a camera operation in accordance with a user operation. "Camera operations" include specific processing other than manipulation-related operations, such as for example, processing relating to automatic focus, photometry, imaging, recording, reproduction, and the like. Specifically, after having detected proximity (that is, in the "eye-on" state), the control unit 201 changes the AF position or changes the settings of shooting conditions when a touch operation is made on the left-hand touch panel 113 or the right-hand touch panel 114.

The control unit 201 accepts, for example, a "Touch-Move" on the touch panel 114, moves the AF position to the position that corresponds to the "Touch-Move", and causes the changed AF position to be displayed in the viewfinder 103. Furthermore, the control unit 201 accepts, for example, a "Touch-Move" on the touch panel 114, and changes the settings of shooting conditions such as a shutter speed, an aperture, an ISO sensitivity, and an exposure compensation based on the "Touch-Move". For example, the control unit 201 enlarges the aperture by half a level in response to an upward "Touch-Move" on the touch panel 114. In contrast, the control unit 201 reduces the aperture by half a level in response to a downward "Touch-Move". Of course, another method for changing a setting value may be used as appropriate, such as a method in which a setting value is increased the longer the distance of a "Touch-Move". Furthermore, it is also possible to set in advance using a predetermined setting menu which setting item can be set by a touch operation. Furthermore, it is also possible to use settable items depending on the touch operation method.

On the other hand, in a case where proximity has not been detected by the control unit 201 (that is, in the non-eye-on state), the control unit 201 does not execute the above-described changing of the AF position or changing of the settings of shooting conditions even when a touch operation is made on the left-hand touch panel 113 or the right-hand touch panel 114.

Note that when an operation is made on the backside operation member (for example, the backside touch panel 105), the control unit 201 performs processing that corresponds to the touch operation (changing shooting conditions such as the AF position, the shutter speed, the aperture, the ISO sensitivity, or the exposure compensation) irrespective of whether or not proximity is detected. Furthermore, the control unit 201 performs processing in response to an operation of a specific operation member arranged on another side, for example, AF operation in response to the shutter button being pressed halfway down, or shooting in response to the shutter button being pressed all the way down (start of still image file recording or moving image file recording), irrespective of whether or not proximity is detected. Furthermore, when the user operates the camera in an operation mode different from the shooting mode, that is, in a reproduction mode in which a still image or a moving image is reproduced, the control unit 201 may also perform the corresponding operation irrespective of the state of display or whether or not proximity is detected. The control unit 201 proceeds to the next step when the camera operation is complete.

In step S307, the control unit 201 determines whether or not the power supply switch 205 is turned off by the user. For example, the control unit 201 determines whether the power supply switch 205 is in the ON state or OFF state, and if the power supply switch is still in the ON state, the control unit 201 returns again to step S302. On the other hand, if the power supply switch 205 is in the OFF state, the power supply is turned off and the series of operations according to the present processing end.

As described above, in the present embodiment, the proximity detection unit 112 performs proximity detection, and an operation on the front-side touch panel (113 and/or 114) arranged on the side different from the display surface side of the viewfinder 103 is controlled to be enabled or disabled. In other words, the control unit 201 is configured to perform control such that, even if an operation is made on the front-side touch panel when "eye-on" with respect to the viewfinder 103 is not detected, specific processing (such as changing a setting of an shooting condition) that corresponds to the operation is not executed. On the other hand, if an operation is made on the front-side touch panel when "eye-on" with respect to the viewfinder 103 is detected, specific processing that corresponds to the operation is executed. With these measures, it is possible to reduce erroneous operations on a front-side touch panel even when the user is carrying the camera in a manner such that he or she may get into contact with the touch panel, making an efficient operation possible when a need such as shooting arises. In other words, it is possible to reduce erroneous operations that may be caused on a touch operation member arranged on a side different from the display surface of the display member.

Second Embodiment

The following will describe a second embodiment. In the forgoing first embodiment, only touch operations on the left-hand touch panel 113 or the right-hand touch panel 114 are controlled in the input operation control processing. In contrast, in input operation control processing of the present embodiment, in addition to operations on the touch panels, operations on the backside touch panel are also controlled.

Note that the present embodiment differs from the first embodiment in part of the input operation control processing, but otherwise they have the same configuration of the digital cameras. Accordingly, the same reference signs are given to the same configurations in which redundant description is omitted, and in the description, the differences are focused on.

Series of Operations of Input Operation Control Processing

Figure 4:
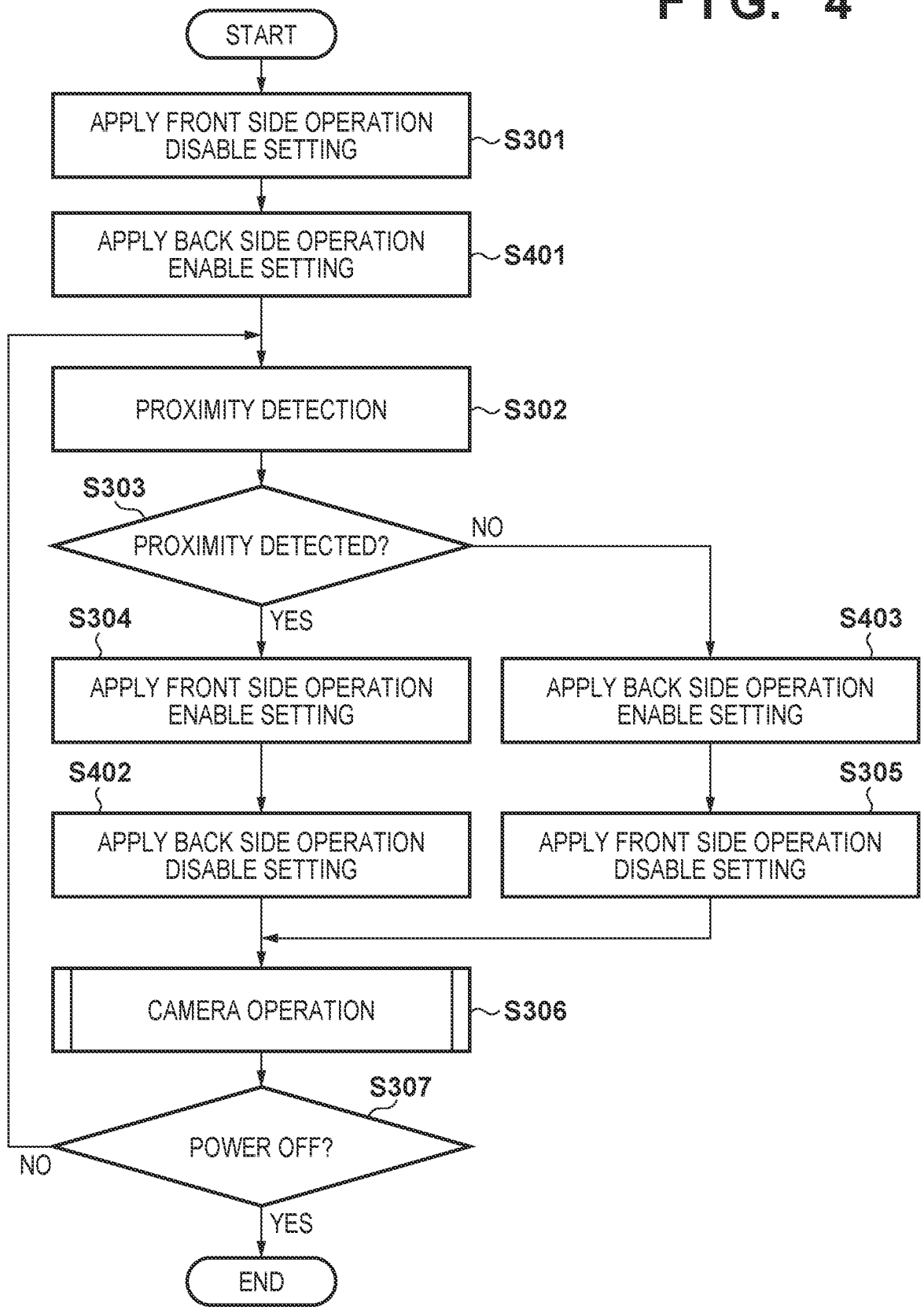
FIG. 4 is a flowchart illustrating a series of operations of input operation control processing according to a second embodiment.

The following will describe a series of operations of input operation control processing of the present embodiment with reference to FIG. 4. Note that the input operation control processing of the present embodiment is to control input operations on the operation members (namely, the backside touch panel 105, the left-hand touch panel 113 and the right-hand touch panel 114) arranged on a plurality of sides of the digital camera 100 to be enabled or disabled, based on whether or not proximity of an object is detected. Furthermore, the present processing is realized by the control unit 201 expanding a program stored in the nonvolatile memory 208 in the work area of the volatile memory 207, executing the expanded program, and controlling the components such as the backside touch panel 105.

Furthermore, the input operation control processing of the present embodiment also starts when the power supply switch 205 is turned on. The following description will be given taking a case where, immediately after the turning-on, the above-described front side operation disable setting and a setting to enable an operation on the backside touch panel 105 (referred to also as "back side operation enable setting") are configured, as an example. However, another setting may be used as appropriate in place of this setting, such as a setting in which the characteristic of the digital camera or former usage state is reflected.

In step S301, the control unit 201 applies the front side operation disable setting, as in the above-described embodiment. Then, in step S401, the back side operation enable setting is applied to enable an operation on the backside touch panel. For example, the control unit 201 reads setting information stored in nonvolatile memory 208 for example, and applies the front side operation disable setting and the back side operation enable setting. That is, the control unit 201 does not accept any user operation on the left-hand touch panel 113 and the right-hand touch panel 114 but accepts an operation on the backside touch panel 105. Also, it is also possible to set another backside operation member of the various switches 206 to be operable, depending on the configuration of the digital camera, or the like. Then, the control unit 201 executes the processing from steps S302 to S305 as in the above-described embodiment.

In step S402, the control unit 201 applies a setting ("back side operation disable setting") to disable any operation on the backside touch panel. That is, with the processing in steps S304 and S402, operations on the touch panels arranged on the front side of the digital camera 100 are enabled, and any operation on the touch panel arranged on the back side thereof is disabled. In other words, it is possible for the user to operate the touch panel on the front side that is easy to operate in the "eye-on" state, and it is also possible to prevent an erroneous operation that may be caused when the nose or part of the face of the user in the "eye-on" state gets into contact with the backside touch panel 105. Note that the control unit 201 may also disable any operation on the operation member arranged on the back side depending on the usage.

In step S403, the control unit 201 applies the back side operation enable setting. That is, when no "eye-on" state of the user is detected, an operation on the backside touch panel 105 is enabled. Also, the control unit 201 applies the front side operation disable setting in step S305, as in the above-described embodiment.

The control unit 201 executes steps S306 to S307, as in the above-described embodiment. In step S307, the control unit 201 determines whether the power supply switch 205 is in the ON or OFF state, and if the power supply switch is in the OFF state, the series of the operations of the present embodiment end.

As described above, in the present embodiment, if proximity is detected by the proximity detection unit 112, any operation on the backside touch panel 105 is disabled. With this measure, it is possible to prevent an erroneous operation that may be caused by the face or nose in the "eye-on" state.

Third Embodiment

The following will describe a third embodiment. A digital camera 500 according to the third embodiment is provided with, on the back side thereof, a live view lever (referred to also as "LV lever") 501, and the present embodiment differs from the above-described embodiments in that operations on the touch panels are controlled based on the setting of this lever. The remaining configuration of the digital camera 500 is the same as in the above-described embodiments. Accordingly, the same reference signs are given to the same configurations in which redundant description is omitted, and in the description, the differences are focused on.

Figure 5:
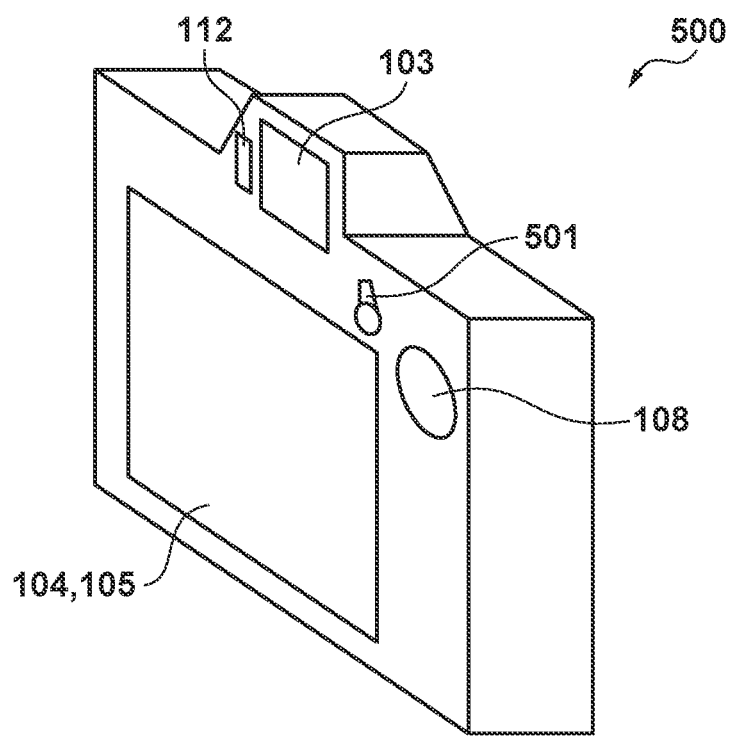
FIG. 5 is a diagram illustrating an example of an external configuration of a digital camera according to a third embodiment.
Figure 6:
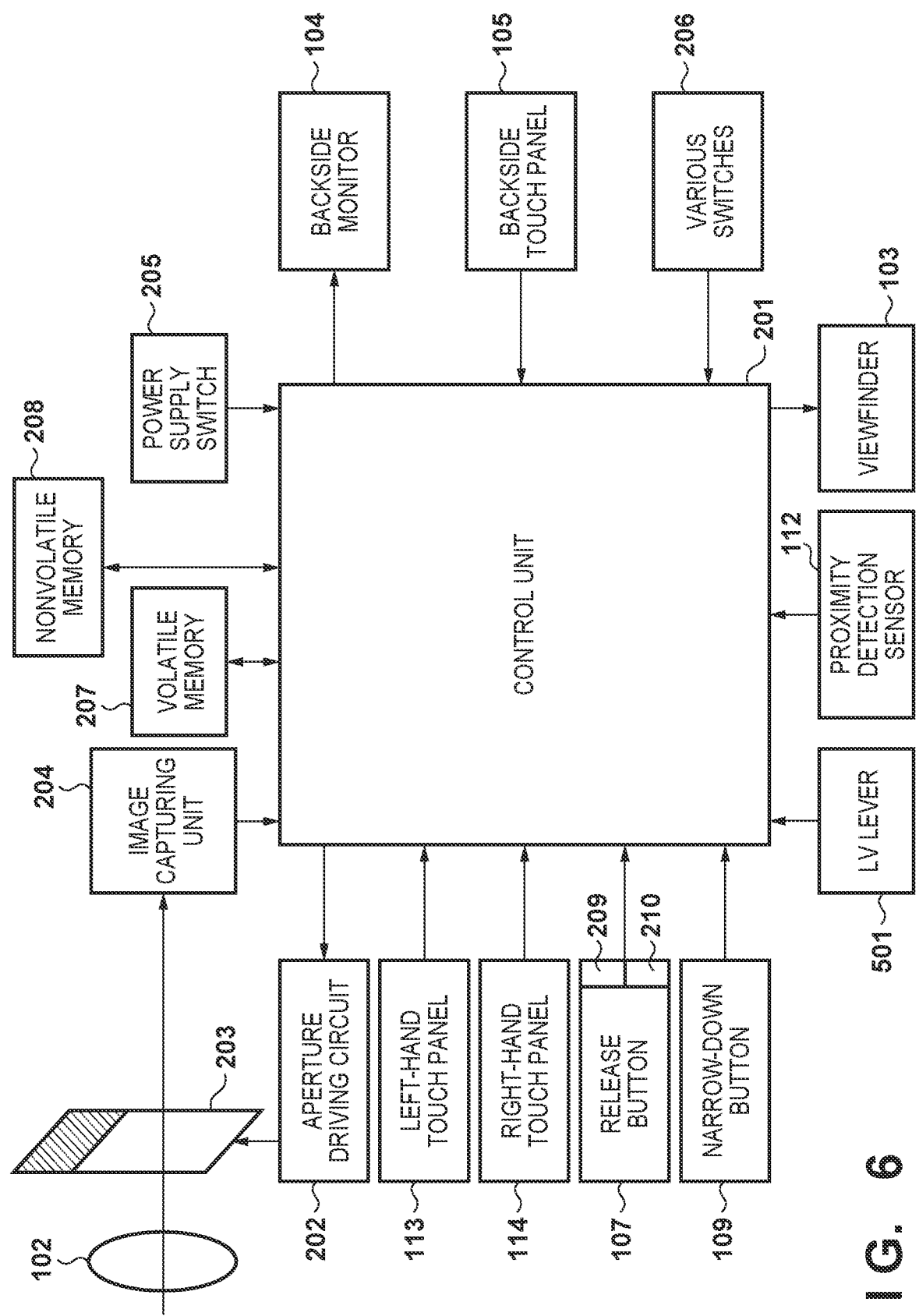
FIG. 6 is a block diagram illustrating an example of a functional configuration of the digital camera according to the third embodiment.

FIG. 5 shows the outer appearance of the back side of the digital camera 500 according to the present embodiment. The digital camera 500 is provided with the LV lever 501 for switching live view display on the backside monitor 104 between ON and OFF. When the LV lever 501 is oriented in a vertical position, the backside monitor 104 is brought into a non-display state, meaning "viewfinder imaging", and when the LV lever 501 is at an angle of 90° to the left, the backside monitor 104 is brought into a display state, meaning "LV imaging". As shown in FIG. 6, the LV lever 501 is connected to the control unit 201, and the control unit 201 acquires the state upon accepting a user instruction regarding the live view display (accepting unit).

Series of Operations of Input Operation Control Processing

Figure 7:
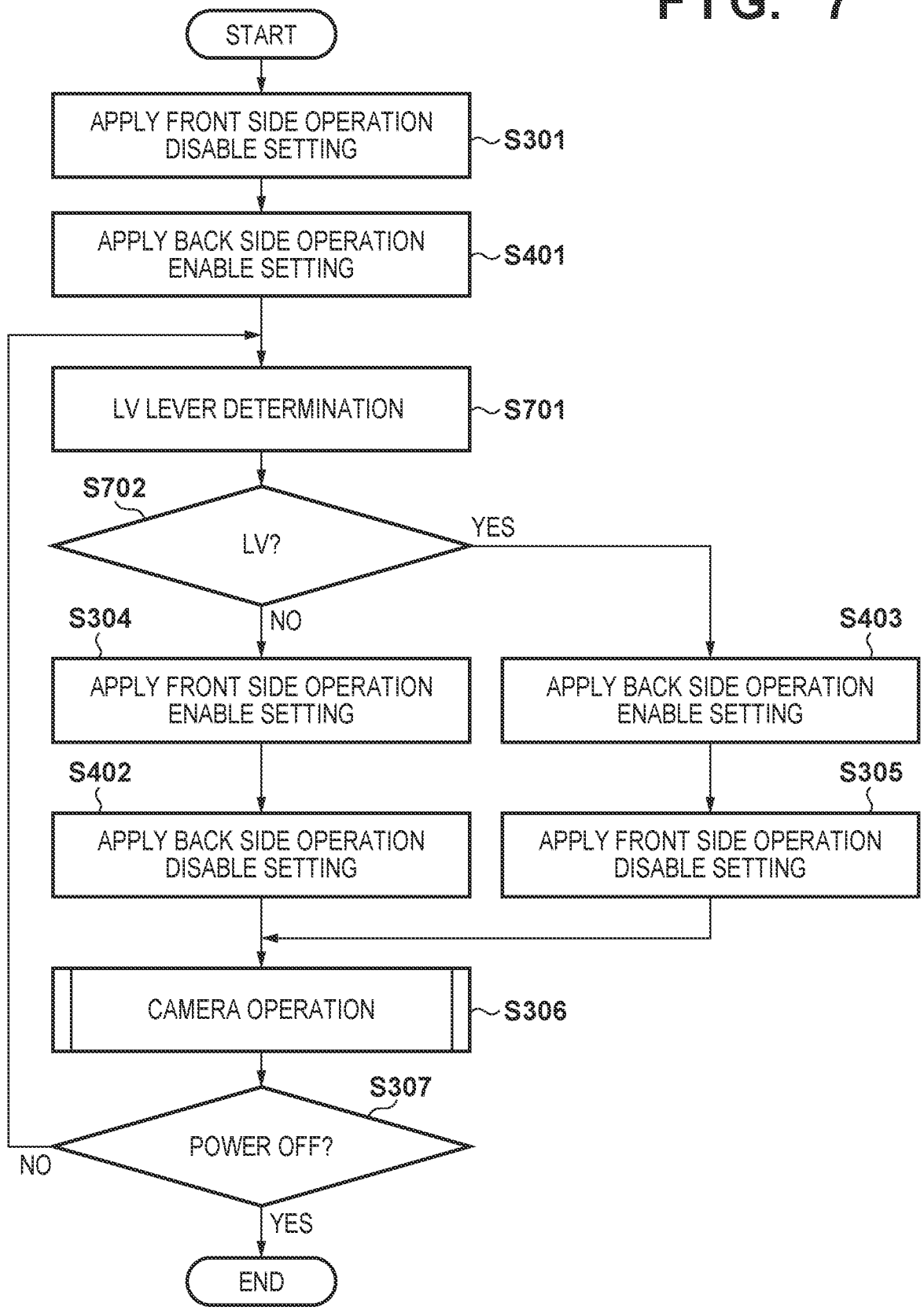
FIG. 7 is a flowchart illustrating a series of operations of input operation control processing according to the third embodiment.

The following will describe a series of operations of input operation control processing with reference to FIG. 7. Note that the input operation control processing of the present embodiment is to control whether input operations on the operation members (namely, the backside touch panel 105, the left-hand touch panel 113 and the right-hand touch panel 114) arranged on a plurality of sides of the digital camera 100 to be enabled or disabled, based on the setting of the LV lever 501. Furthermore, the processing is realized by the control unit 201 expanding a program stored in the nonvolatile memory 208 in the work area of the volatile memory 207, executing the expanded program, and controlling the components such as the backside touch panel 105.

Furthermore, the input operation control processing of the present embodiment also starts when the power supply switch 205 is turned on. The following description will be given taking a case where, immediately after the turning-on, the above-described front side operation disable setting and back side operation enable setting are configured, as an example. However, another setting may be used as appropriate in place of this setting, such as a setting in which the characteristic of the digital camera or former usage state is reflected.

The control unit 201 executes the processing of steps S301 and S401 as in the second embodiment. Then, in step S701, the control unit 201 receives a signal from the LV lever 501 and reads the state of the LV lever 501.

In step S702, the control unit 201 determines, based on the signal from the LV lever 501, whether or not the setting of the LV lever indicates LV shooting. If it is determined that the setting of the LV lever 501 indicates LV shooting, the control unit 201 proceeds to step S403, and if it is determined that the setting of the LV lever 501 does not indicate LV shooting, the control unit 201 proceeds to step S304. That is, if the digital camera 500 is set so as not to perform LV shooting (in which the backside monitor 104 is in the non-display state), the control unit 201 performs control on the assumption that a user performs shooting while looking through the viewfinder 103. Specifically, in the subsequent procedures of steps S304, S402, and S306, operations on the left-hand touch panel 113 and the right-hand touch panel 114 are enabled, and any operation on the backside touch panel 105 is disabled. On the other hand, if the digital camera 500 is set so as to perform LV shooting (the backside monitor 104 is in the display state), the control unit 201 performs control on the assumption that the user performs shooting while viewing the backside monitor 104. Specifically, in the subsequent procedures of steps S403, S305, and S306, any operation on the left-hand touch panel 113 and the right-hand touch panel 114 is disabled, and any operation on the backside touch panel 105 is enabled.

In step S307, the control unit 201 determines whether the power supply switch 205 is in the ON state or OFF state, as in the above-described embodiments, and if the power supply switch is in the OFF state, the series of operations of the present embodiment end.

As described above, the present embodiment is configured such that, depending on the setting of the LV lever 501 regarding LV shooting, operations on the touch panels arranged on the front side and operations on the backside touch panel 105 are controlled to be enabled or disabled. With these measures, it is possible to reduce erroneous operations on a front-side touch panel even in LV shooting in which the user is holding the camera in a manner such that he or she may get into contact with the touch panel. In other words, it is possible to reduce erroneous operations that may be caused on a touch operation member arranged on a side difference from the display surface of the display member. It is furthermore possible to reduce erroneous operations that may be caused due to the face or nose of a user when he or she performs shooting while looking through the viewfinder.

Fourth Embodiment

The following will further describe a fourth embodiment. The fourth embodiment differs from the above-described embodiments in that, in a digital camera to which a replaceable imaging lens 801 according to the present embodiment can be attached, operations on the touch panels are controlled to be enabled or disabled based on the replaceable imaging lens 801 being in contact with a predetermined member. Accordingly, the same reference signs are given to the same configurations in which redundant description is omitted, and in the description, the differences are focused on.

Figure 8A:
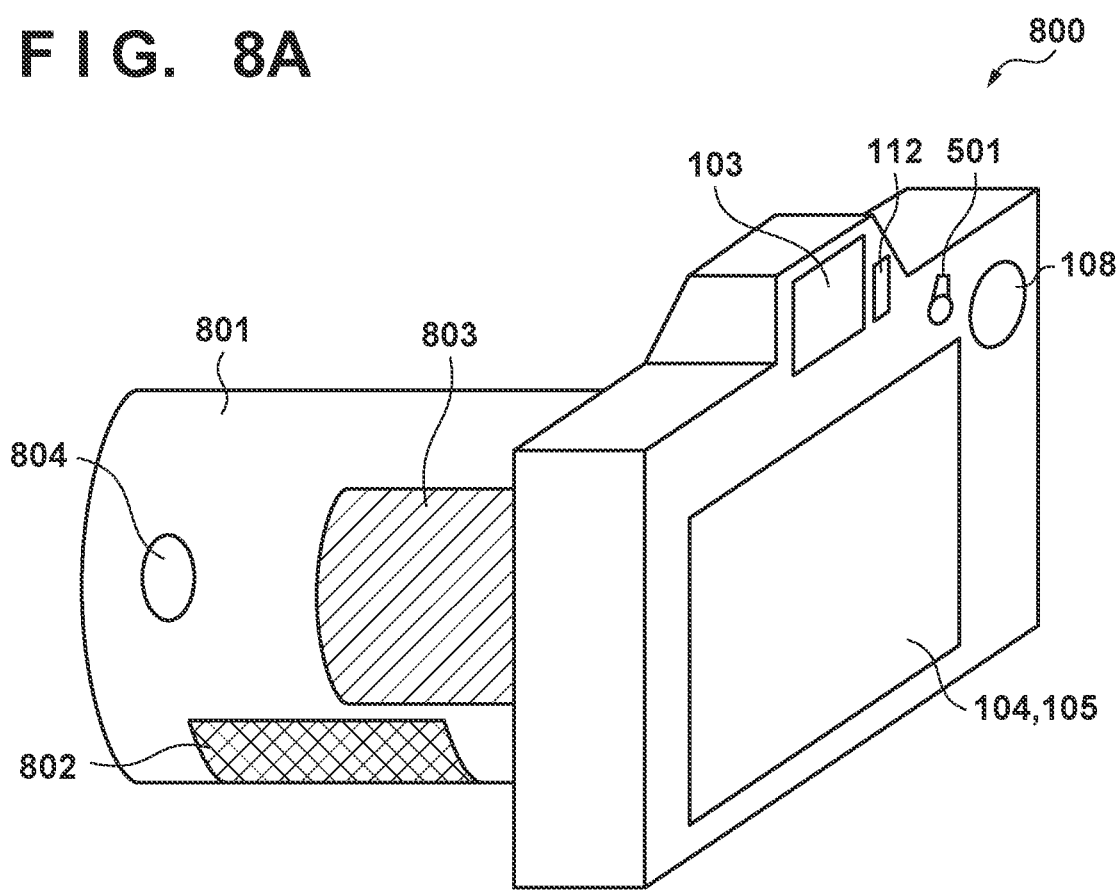
FIGS. 8A to 8B illustrate an example of an external configuration of a digital camera according to a fourth embodiment.
Figure 8B:
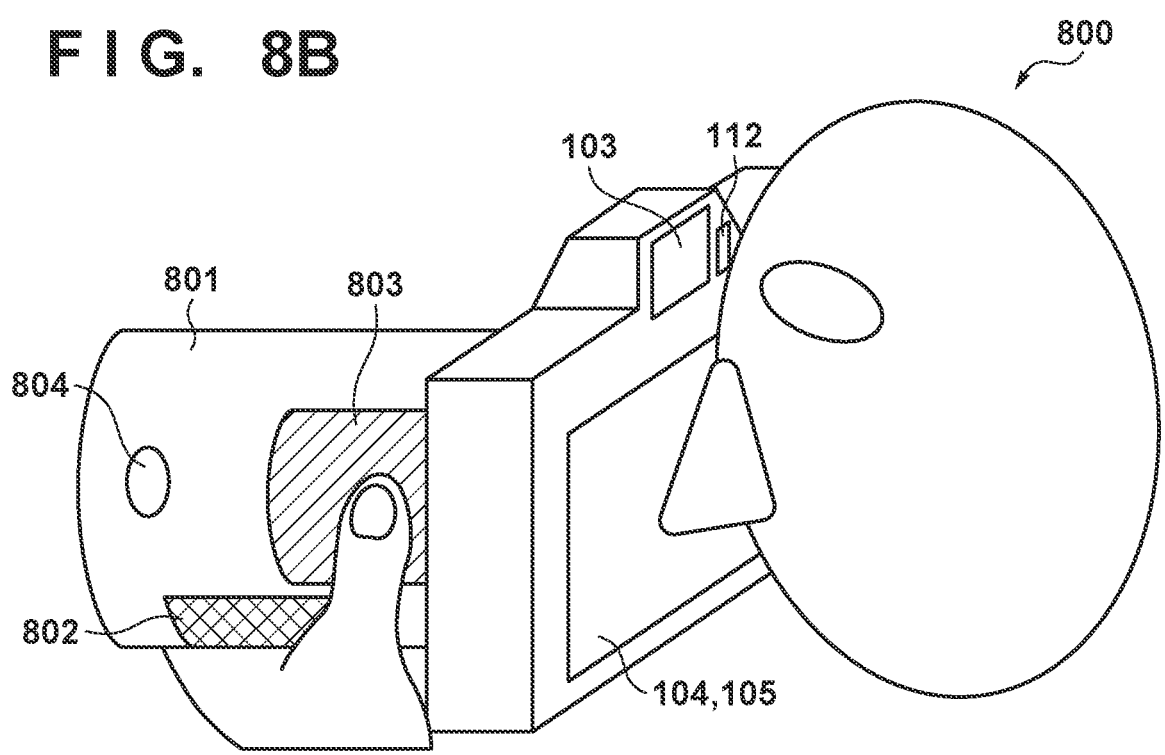

FIG. 8A shows the outer appearance of a digital camera 800 according to the present embodiment, and FIG. 8B illustrates the state in which a user performs shooting using the digital camera 800. The reference numeral 801 is a detachable imaging lens, which includes operation members. The imaging lens 801 includes a contact detection unit 802 for detecting contact of a hand of the user, a lens touch panel 803 arranged on the side surface of the lens, and a lens switch 804.

The contact detection unit 802 may employ, for example, an infrared proximity sensor, and can detect proximity or contact of the hand when the user is to hold the imaging lens 801 with his or her hand. When an object (the hand of the user) is in contact, infrared light projected from a light projecting unit (not shown) of the contact detection unit 802 is reflected and is received by a light receiving unit (not shown) of the infrared proximity sensor. The contact detection unit 802 can also determine, based on the amount of the received infrared light for example, how close to the imaging lens 801 the object is (contact distance). Note that the contact detection unit 802 of the present embodiment is configured to detect contact if an object in a non-contacting state is brought into proximity to (or into contact with) the imaging lens 801 by less than a predetermined distance. Furthermore, the contact detection unit 802 is configured to detect transition from the contacting state to the non-contacting state if the object detected as being in contact is moved away by a predetermined distance or more. These thresholds may be different from each other by providing a hysteresis, for example. Note that the infrared proximity sensor is an example, and the contact detection unit 802 may also employ another sensor as long as it can detect proximity or contact of an object such as a hand. For example, a sensor for detecting a change in static electricity or a sensor for detecting pressure or a displacement of a component may also be used.

The lens touch panel 803 can detect the same operations and conditions as those on the above-described backside touch panel 105, left-hand touch panel 113 and right-hand touch panel 114. Furthermore, the lens touch panel 803 may employ a touch panel method that relies upon any of the following: resistive film, electrostatic capacitance, surface acoustic waves, infrared radiation, electromagnetic induction, image recognition and optical sensing. The lens switch 804 includes a switch for switching the focus mode to MF or AF, for example.

As shown in FIG. 8B, the user holds the imaging lens 801 with his or her left hand when performing shooting while looking through the viewfinder 103 of the digital camera 800 according to the present embodiment. In this state, the contact detection unit 802 detects contact of the hand. Furthermore, the lens touch panel 803 is arranged at a position at which a finger of the user can reach the lens touch panel 803 when he or she is holding the imaging lens 801. Accordingly, it is possible for the user to operate the lens touch panel 803 while holding the imaging lens 801. Whether the lens switch 804 is set to be enabled or disabled may be associated with the detection state of the contact detection unit 802, or may be set always to be enabled.

Series of Operations of Input Operation Control Processing

Figure 9:
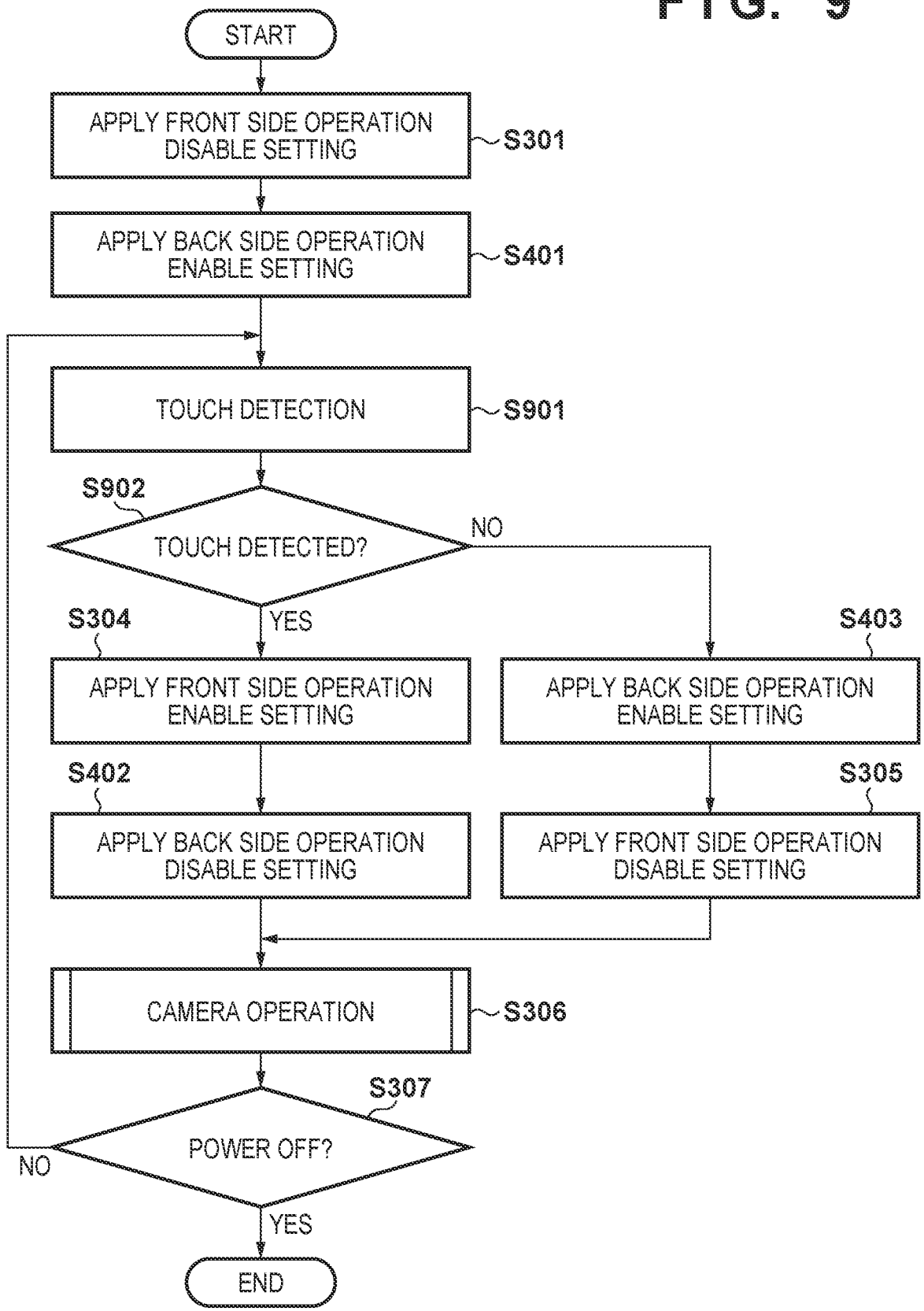
FIG. 9 is a flowchart illustrating a series of operations of input operation control processing according to the fourth embodiment.
Figure 10A:
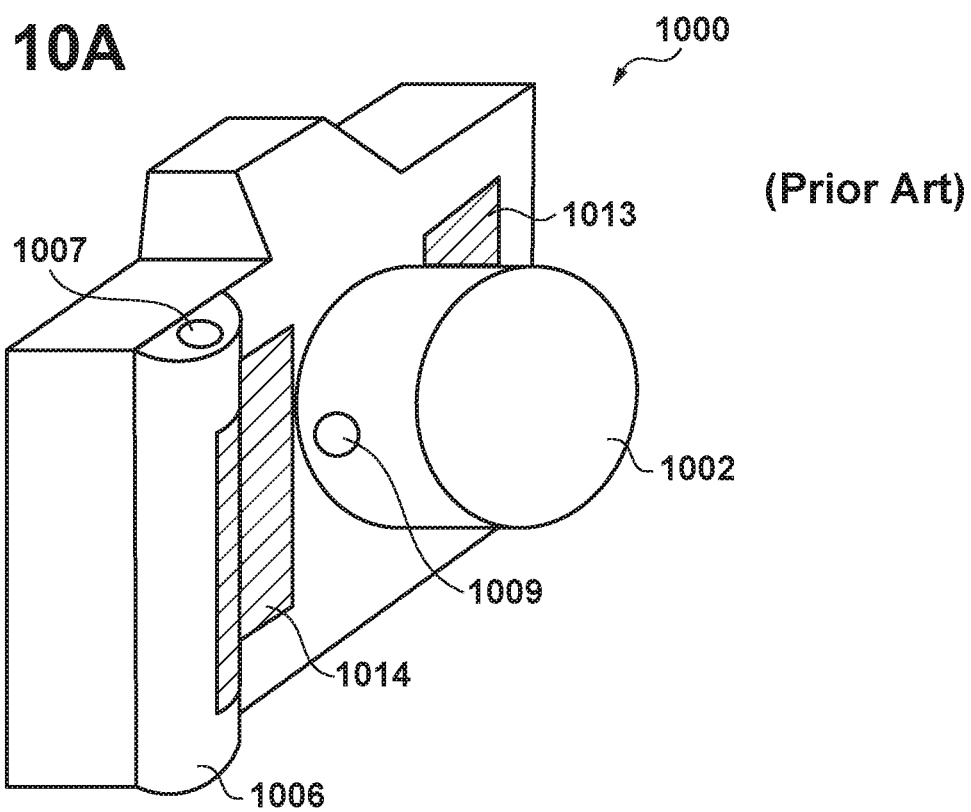
FIGS. 10A to 10B illustrate an operation aspect of a conventional electronic device.
Figure 10B:
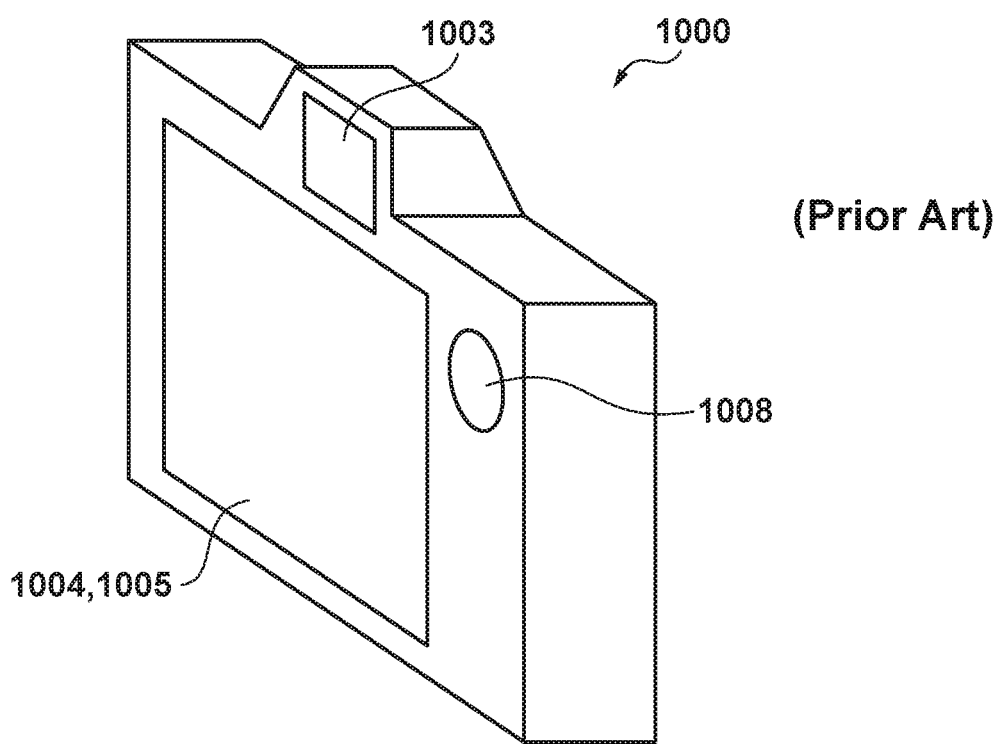
Figure 11A:
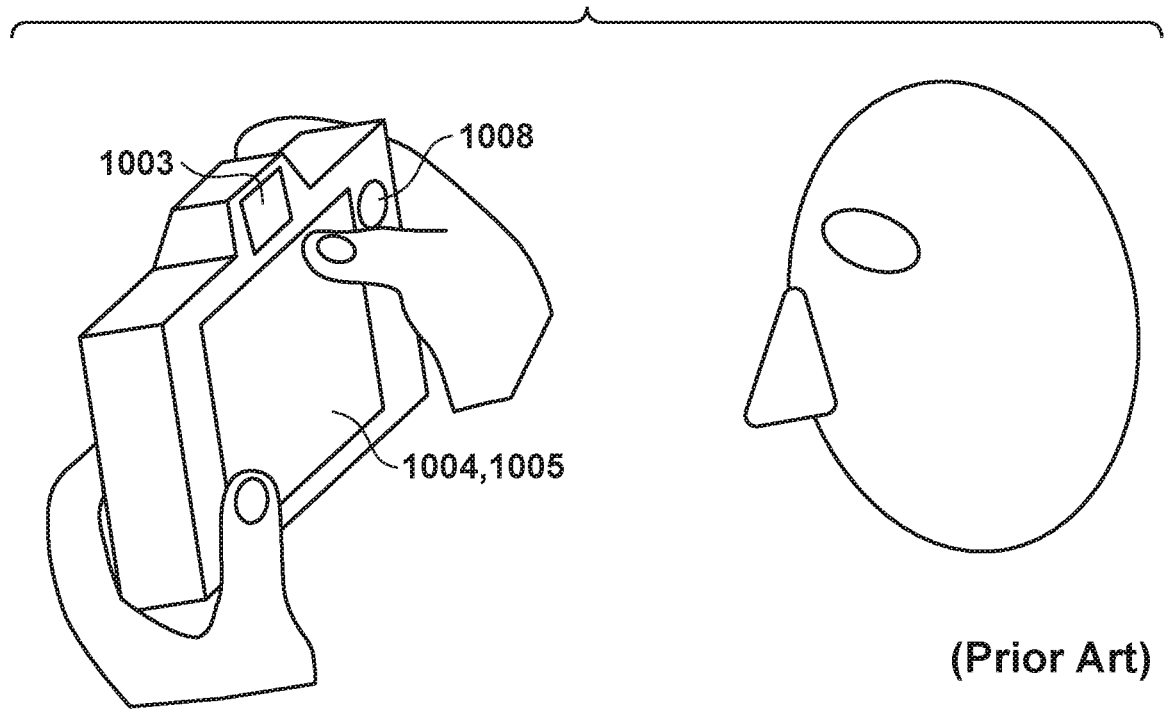
FIGS. 11AA to 11AB illustrate an operation aspect of the conventional electronic device.
Figure 11A:
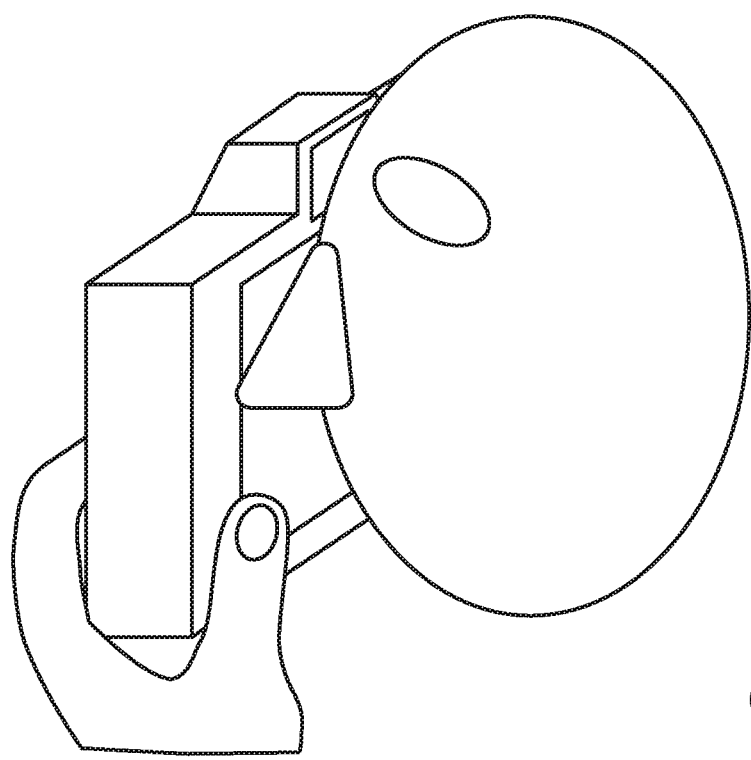
Figure 11B:
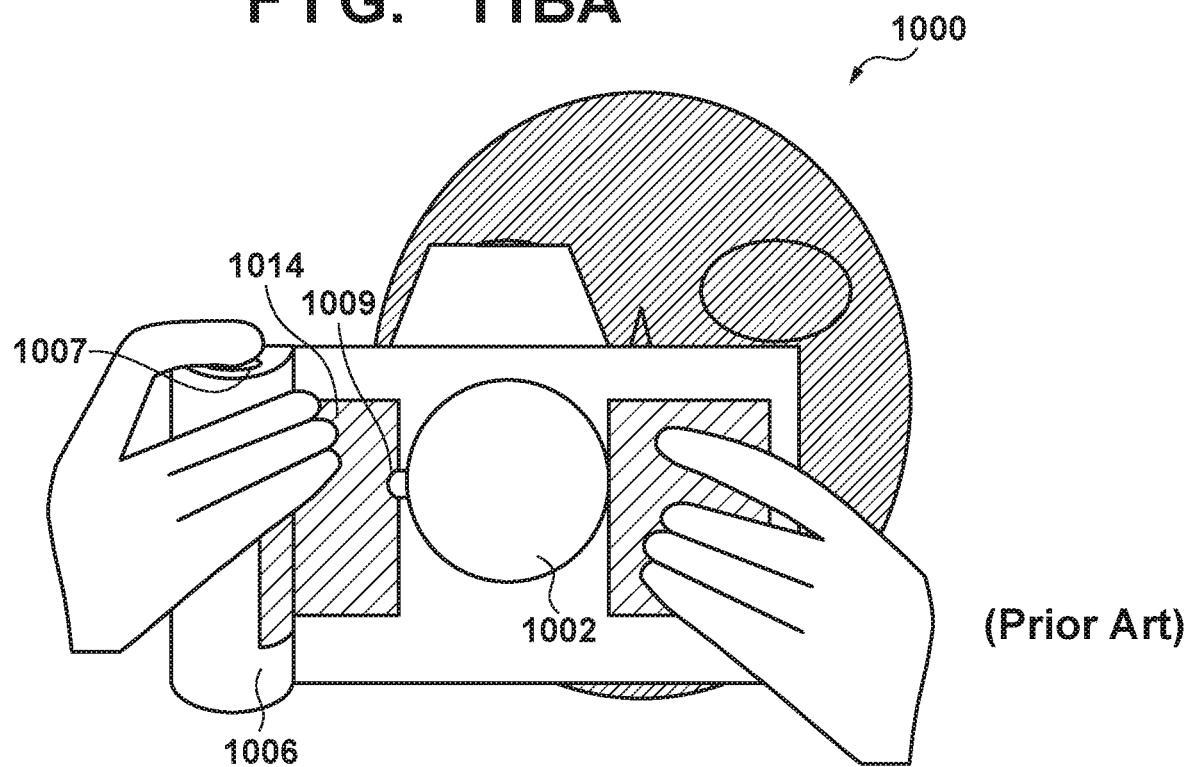
FIGS. 11BA to 11BB illustrate an operation aspect of the conventional electronic device.
Figure 11B:
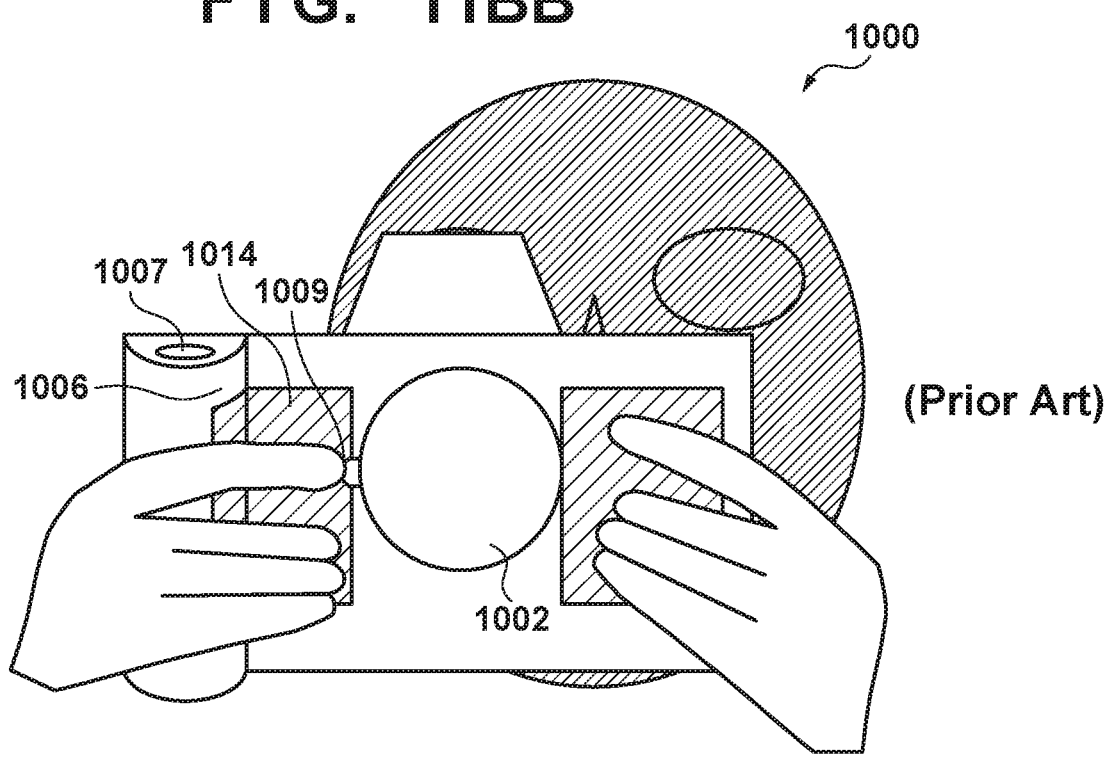
Figure 11C:
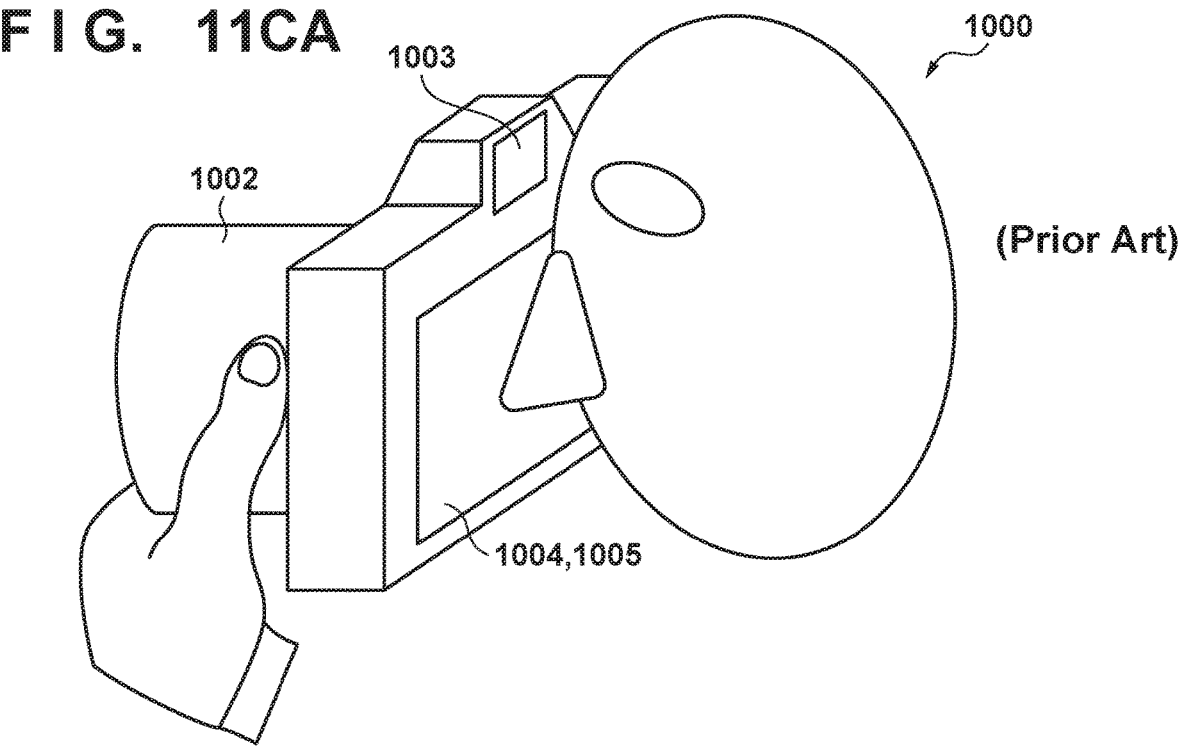
FIGS. 11CA to 11CB illustrate an operation aspect of the conventional electronic device.
Figure 11C:
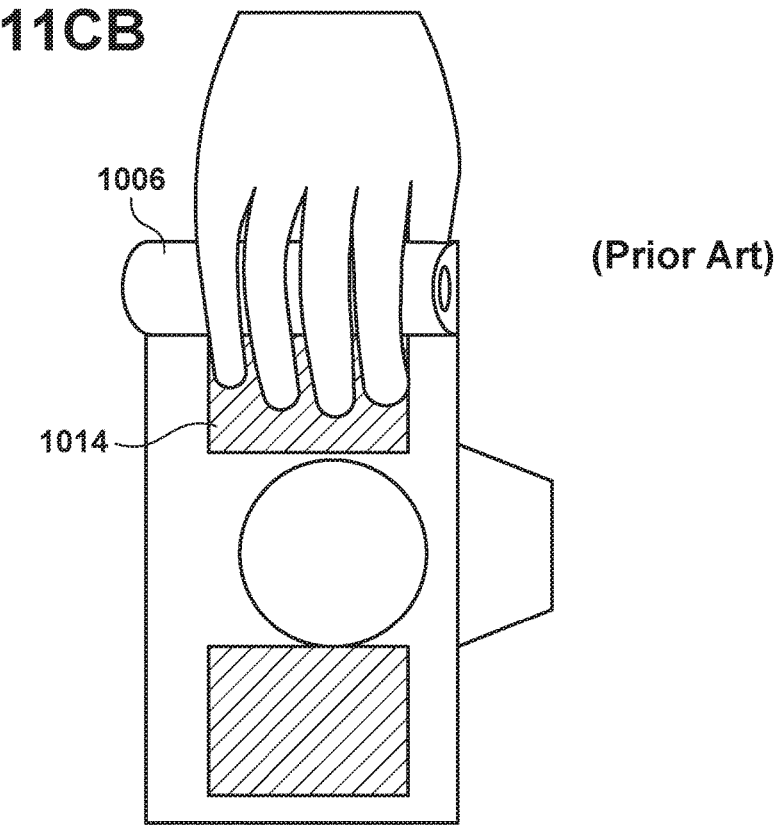

The following will describe a series of operations of input operation control processing of the present embodiment with reference to FIG. 9. Note that input operation control processing of the present embodiment is to control, based on a detection result of the contact detection unit 802, whether input operations on the backside touch panel 105 and an operation member (the imaging lens 801) arranged on a side different from the back side are enabled or disabled. Furthermore, the present processing is realized by the control unit 201 expanding a program stored in the nonvolatile memory 208 in the work area of the volatile memory 207, executing the expanded program, and controlling the components such as the backside touch panel 105.

Furthermore, the input operation control processing of the present embodiment also starts when the power supply switch 205 is turned on. The following description will be given taking a case where, immediately after the turning-on, the above-described front side operation disable setting and back side operation enable setting are configured, as an example. Note that the front side operation disable setting in the present embodiment is the setting to disable any operation on the lens touch panel 803, instead of on the left-hand touch panel 113 and the right-hand touch panel 114 as in the above-described embodiments. Similarly, the front side operation enable setting of the present embodiment is the setting to enable an operation on the lens touch panel 803, instead of on the left-hand touch panel 113 and the right-hand touch panel 114.

The control unit 201 executes the processing of steps S301 and S401 as in the second embodiment. Then, in step S901, the control unit 201 performs detection as to whether the imaging lens 801 is contacted by a hand. The control unit 201 reads the state of contact of an object with the imaging lens 801 based on an output signal from the contact detection unit 802, for example. In step S902, the control unit 201 determines whether or not a contact of an object is made. If the output signal from the contact detection unit 802 indicates that a contact of an object has been detected, the control unit 201 determines that an object being in contact therewith has been detected, and proceeds to step S304. On the other hand, if the output signal from the contact detection unit 802 indicates that a contact of an object has not been detected, the control unit 201 determines that no contact has been detected, and proceeds to step S403. That is, if it is assumed that the user can operate the lens touch panel 803 while holding the imaging lens 801, the procedure proceeds to the processing of step S304, and if it is assumed that the user does not hold the imaging lens 801, the procedure proceeds to the processing of step S403. Then, the control unit 201 executes the processing of steps S402, S305, and S306 as in the second embodiment, and if it is determined in step S307 that the power supply is turned off, the series of processing of the present embodiment end.

Note that in the present embodiment, the description was given taking the detachable and replaceable lens provided with the contact detection unit 802 and the lens touch panel 803, as an example. However, the present embodiment is applicable to a detachable member such as an electronic flash gun, a wireless adapter, or an extension grip unit, as long as it can detect a touch when a user holds it, and is provided with an operation member that a user can hold and operate.

Furthermore, in the present embodiment, the description was given taking a case where a detection result of the contact detection unit 802 is used, as an example, but instead, a logical multiplication AND of a detection result of the proximity detection unit 112 and a detection result of the contact detection unit 802 may also be used. Alternatively, a logical addition OR of a detection result of the proximity detection unit 112 and a detection result of the contact detection unit 802 may also be used.

As described above, in the present embodiment, operations on the touch panel arranged on the lens and operations on the backside touch panel 105 are controlled to be enabled or disabled, depending on a detection result of the contact detection unit 802 of the imaging lens 801. Accordingly, it is possible to reduce erroneous operations on the lens touch panel that may be caused when a user merely gets into contact with the lens touch panel without holding the imaging lens 801.

Other Embodiments

Note that the above-described various types of control described as being performed by the control unit 201 may be performed by a single item of hardware, or the entire apparatus may be controlled by a plurality of items of hardware sharing processing.

Although the present invention has been described in detail based on the preferred embodiments, the present invention is not limited to the specific embodiments and includes various modifications without departing from the concept of the present invention. The above-described embodiments are merely illustrative embodiments of the present invention, and may be combined where appropriate.

The above-described embodiments have dealt with an example in which the present invention is applied to a digital camera, but the present invention is not limited to this example, and is applicable to an electronic device that can employ a touch operation member arranged on a side different from the display surface of the display member. That is to say, the present invention is applicable to, for example, the following apparatuses: a personal computer, a PDA, a mobile phone, a mobile image viewer, a game console, an electronic book reader, a tablet terminal, a smartphone, a medical device, a home electric appliance with a display, an on-board device, and the like.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-134952, filed Jul. 10, 2017, which is hereby incorporated by reference herein in its entirety.

What is claimed is:

1. An image capturing apparatus comprising:
an image capturing unit;
a display unit visible via an eyepiece viewfinder;
a specific operation unit arranged on a main body of the image capturing apparatus on a subject side with respect to an eyepiece unit of the eyepiece viewfinder, or arranged on a circumference of a barrel of an imaging lens;
a memory; and
at least one processor which functions as a control unit configured to perform control such that in a case where the image capturing apparatus takes a driven state, in which the image capturing apparatus is on, and in a case where the display unit is in a display state, specific processing is performed in response to an operation made on the specific operation unit, and in a case where the image capturing apparatus takes the driven state, in which the image capturing apparatus is on, and in a case where the display unit is in a non-display state, the specific processing is not performed even when an operation is made on the specific operation unit,
wherein the at least one processor functioning as the control unit is configured to perform control such that in a shooting mode, execution of processing that corresponds to an operation made on the specific operation unit is restricted, and in a reproduction mode, the processing that corresponds to an operation made on the specific operation unit is executed, irrespective of whether or not proximity of an object to a display surface side of the display unit is detected, or whether the display unit is in the display state or the non-display state.

2. The apparatus according to claim 1, further comprising an accepting unit configured to accept an instruction from a user to switch the display unit to the display state or the non-display state.

3. The apparatus according to claim 1, wherein the display unit is a display unit for information display that is arranged inside an electronic viewfinder capable of displaying a live view image captured by the image capturing unit, or an optical viewfinder that enables a subject optical image to be viewed.

4. The apparatus according to claim 1, wherein the specific operation unit is a touch sensor capable of detecting a touch operation.

5. The apparatus according to claim 1, wherein the at least one processor functioning as the control unit is configured to perform control such that in a case where the specific processing has been executed, the display unit performs display in accordance with the specific processing.

6. The apparatus according to claim 1, further comprising a grip unit configured to facilitate a user to hold the image capturing apparatus,
wherein the specific operation unit is arranged at a position at which the specific operation unit can be operated with a finger of a hand holding the grip unit.

7. The apparatus according to claim 1, wherein the specific processing changes at least one of shooting conditions such as a shutter speed, an aperture, an ISO sensitivity, and an exposure compensation in accordance with an operation of the specific operation unit.

8. A control method of an image capturing apparatus that comprises an image capturing unit, a display unit visible via an eyepiece viewfinder, and a specific operation unit arranged on a main body of the image capturing apparatus on a subject side with respect to an eyepiece unit of the eyepiece viewfinder, or arranged on a circumference of a barrel of an imaging lens, the method comprising:
performing control such that in a case where the image capturing apparatus takes a driven state, in which the image capturing apparatus is on, and in a case where the display unit is in a display state, specific processing is performed in response to an operation made on the specific operation unit, and in a case where the image capturing apparatus takes the driven state, in which the image capturing apparatus is on, and in a case where the display unit is in a non-display state, the specific processing is not performed even when an operation is made on the specific operation unit,
wherein the performing control includes performing control such that in a shooting mode, execution of processing that corresponds to an operation made on the specific operation unit is restricted, and in a reproduction mode, the processing that corresponds to an operation made on the specific operation unit is executed, irrespective of whether or not proximity of an object to a display surface side of the display unit is detected, or whether the display unit is in the display state or the non-display state.

9. A non-transitory computer-readable storage medium storing a program for causing a computer to execute a control method of an image capturing apparatus that comprises an image capturing unit, a display unit visible via an eyepiece viewfinder, and a specific operation unit arranged on a main body of the image capturing apparatus on a subject side with respect to an eyepiece unit of the eyepiece viewfinder, or arranged on a circumference of a barrel of an imaging lens, the method comprising:
performing control such that in a case where the image capturing apparatus takes a driven state, in which the image capturing apparatus is on, and in a case where the display unit is in a display state, specific processing is performed in response to an operation made on the specific operation unit, and in a case where the image capturing apparatus takes the driven state, in which the image capturing apparatus is on, and in a case where the display unit is in a non-display state, the specific processing is not performed even when an operation is made on the specific operation unit,
wherein the performing control includes performing control such that in a shooting mode, execution of processing that corresponds to an operation made on the specific operation unit is restricted, and in a reproduction mode, the processing that corresponds to an operation made on the specific operation unit is executed, irrespective of whether or not proximity of an object to a display surface side of the display unit is detected, or whether the display unit is in the display state or the non-display state.

* * * * *